United States Patent
Xu et al.

(10) Patent No.: US 11,137,157 B2
(45) Date of Patent: Oct. 5, 2021

(54) METHOD FOR CONTROLLING MULTI-SPLIT AIR CONDITIONER, MULTI-SPLIT AIR CONDITIONER SYSTEM, AND COMPUTER-READABLE STORAGE MEDIUM

(71) Applicants: GD MiDEA HEATING & VENTILATING EQUIPMENT CO., LTD., Foshan (CN); MIDEA GROUP CO., LTD., Foshan (CN)

(72) Inventors: Yongfeng Xu, Foshan (CN); Hongwei Li, Foshan (CN); Meibing Xiong, Foshan (CN); Yunpeng Jiang, Foshan (CN)

( * ) Notice: Subject to any disclaimer, the term of this patent is extended or adjusted under 35 U.S.C. 154(b) by 136 days.

(21) Appl. No.: 16/493,301

(22) PCT Filed: Dec. 8, 2017

(86) PCT No.: PCT/CN2017/115322
§ 371 (c)(1),
(2) Date: Sep. 12, 2019

(87) PCT Pub. No.: WO2019/052035
PCT Pub. Date: Mar. 21, 2019

(65) Prior Publication Data
US 2021/0148588 A1    May 20, 2021

(30) Foreign Application Priority Data

Sep. 18, 2017  (CN) .................. 201710846781.X
Sep. 18, 2017  (CN) .................. 201710848877.X

(51) Int. Cl.
*F24F 11/30*    (2018.01)
*F24F 11/63*    (2018.01)
(Continued)

(52) U.S. Cl.
CPC .............. *F24F 11/30* (2018.01); *F24F 11/63* (2018.01); *F24F 11/64* (2018.01); *F24F 11/65* (2018.01);
(Continued)

(58) Field of Classification Search
CPC .. F24F 11/30; F24F 11/64; F24F 11/65; F24F 11/89; F24F 11/63; F24F 2140/50;
(Continued)

(56) References Cited

U.S. PATENT DOCUMENTS 10,203,122 B2 *  2/2019  Hasegawa ............. F24F 12/006
2014/0034145 A1 *  2/2014  Burt .................... F24D 19/0095
                                                                137/59
(Continued)

FOREIGN PATENT DOCUMENTS

CN    1455197 A     11/2003
CN    101086370 A   12/2007
(Continued)

OTHER PUBLICATIONS

OA dated Mar. 5, 2019 for CN application 201710846781.X.
(Continued)

*Primary Examiner* — Ramesh B Patel
(74) *Attorney, Agent, or Firm* — Kilpatrick Townsend & Stockton

(57) ABSTRACT

A method for controlling a multi-split air conditioner. The method includes detecting whether the degree of superheat of each outdoor unit meets a target requirement, if yes, determining whether a difference between an average exhaust temperature of each outdoor unit and an average exhaust temperature of an outdoor unit system reaches a preset value, if yes, comparing the size of the average exhaust temperature of each outdoor unit with the size of the average exhaust temperature of the outdoor unit system,
(Continued)

according to the result between the size of the average exhaust temperature of each outdoor unit and the size of the average exhaust temperature of the outdoor unit system, controlling an electronic expansion valve to actuate to make the average exhaust temperature of each outdoor unit to approximate to the average exhaust temperature of the outdoor unit system.

20 Claims, 14 Drawing Sheets

(51) Int. Cl.
| | |
|---|---|
| *F24F 11/64* | (2018.01) |
| *F24F 11/65* | (2018.01) |
| *F24F 11/89* | (2018.01) |
| *G05B 19/042* | (2006.01) |
| *F24F 140/60* | (2018.01) |
| *F24F 140/50* | (2018.01) |
| *F24F 110/10* | (2018.01) |
| *F25B 41/31* | (2021.01) |

(52) U.S. Cl.
CPC ............ *F24F 11/89* (2018.01); *G05B 19/042* (2013.01); *F24F 2110/10* (2018.01); *F24F 2140/50* (2018.01); *F24F 2140/60* (2018.01); *F25B 41/31* (2021.01); *F25B 2400/06* (2013.01); *F25B 2600/2513* (2013.01); *F25B 2700/21152* (2013.01); *G05B 2219/2614* (2013.01)

(58) Field of Classification Search
CPC . F24F 2140/60; F24F 2110/10; G05B 19/042; G05B 2219/2614; F25B 2600/2513; F25B 41/31; F25B 2400/06; F25B 2700/21152
See application file for complete search history.

(56) References Cited

U.S. PATENT DOCUMENTS

| | | | |
|---|---|---|---|
| 2015/0143806 A1* | 5/2015 | Friesth | F03G 7/04 60/517 |
| 2015/0285526 A1* | 10/2015 | Smith | F24F 11/62 700/276 |
| 2015/0323208 A1* | 11/2015 | Son | F24F 11/62 700/276 |
| 2016/0363335 A1* | 12/2016 | Xiong | F24F 11/62 |
| 2017/0108231 A1* | 4/2017 | Hasegawa | F24F 3/147 |
| 2017/0108235 A1* | 4/2017 | Guan | F24F 11/30 |
| 2019/0255910 A1* | 8/2019 | Kuroda | B60H 1/00271 |
| 2020/0072486 A1* | 3/2020 | Matsubara | F24F 11/64 |
| 2020/0088438 A1* | 3/2020 | Shiono | F24F 11/77 |

FOREIGN PATENT DOCUMENTS

| | | |
|---|---|---|
| CN | 102767887 A | 11/2012 |
| CN | 103851847 A | 6/2014 |
| CN | 104422072 A | 3/2015 |
| CN | 104566823 A | 4/2015 |
| CN | 104776659 A | 7/2015 |
| CN | 106642546 A | 5/2017 |
| CN | 106895557 A | 6/2017 |
| CN | 107024027 A | 8/2017 |
| EP | 1657504 A1 | 5/2006 |
| EP | 2532992 A1 | 12/2012 |
| JP | H02247442 A | 10/1990 |
| JP | H085183 A | 1/1996 |
| JP | 2005121362 A | 5/2015 |
| KR | 20050037730 A | 4/2005 |
| KR | 20070077639 A | 7/2007 |
| KR | 20070052887 A | 5/2017 |

OTHER PUBLICATIONS

OA dated Aug. 20, 2019 for CN application 201710846781.X.
OA dated Dec. 6, 2019 for CN application 201710846781.X.
OA for EP application 17925459.4.
OA for KR application 10-2019-7023357.

* cited by examiner

METHOD FOR CONTROLLING MULTI-SPLIT AIR CONDITIONER, MULTI-SPLIT AIR CONDITIONER SYSTEM, AND COMPUTER-READABLE STORAGE MEDIUM

CROSS-REFERENCES TO RELATED APPLICATIONS

The present disclosure is a national phase application of International Application No. PCT/CN2017/115322, filed on Dec. 8, 2017, which claims the priority of Chinese Application No. 201710846781.X, filed in the Chinese Patent Office on Sep. 18, 2017, and claims the priority of Chinese Application No. 201710848877.X, filed in the Chinese Patent Office on Sep. 18, 2017, the entireties of which are herein incorporated by reference.

FIELD

The present disclosure relates to the electronic equipment technology field, and more particularly, to a method for controlling a multi-split air conditioner, a multi-split air conditioner system, and a computer-readable storage medium.

BACKGROUND

Due to the influence of installation location, installation pipeline, spacing and drop height of outdoor units, and so on, an uneven distribution of refrigerant among outdoor units would arise in actual use of a multi-split air conditioner unit, especially multi-split units connected in parallel, resulting in an abnormal operating of the outdoor units. For example, an outdoor unit with a large amount of refrigerant may have a backflow, an outdoor unit with a small amount of refrigerant may have a high exhaust temperature, and problems of abrasion owing to the lack of oil, or even damage of the outdoor units and destruction of compressors may occur.

For outdoor units with different capacities, the distribution of the refrigerant as balanced as possible can be achieved through the installation of corresponding pipe diameter and the use of corresponding valve body control method during parallel connection. However, for the parallel connection of multiple outdoor units with the same capacity, as they have exactly the same pipe diameter and valve body control, the results described above may appear and lead to a low reliability of the refrigeration system when the uneven distribution of the refrigerant among outdoor units occurs due to the influence of installation location, the spacing and drop height of the outdoor units and the like.

SUMMARY

One embodiment of the present disclosure is to provide a method for controlling a multi-split air conditioner, a multi-split air conditioner system, and a computer-readable storage medium, aiming at solving the problem of the uneven distribution of the refrigerant among outdoor units in a multi-split air conditioner system.

In one embodiment, the present disclosure provides a method for controlling a multi-split air conditioner. The multi-split air conditioner includes at least two outdoor units, each outdoor unit includes at least one compressor, and at least two outdoor units constitute an outdoor unit system, the method for controlling the multi-split air conditioner includes:

detecting whether a degree of superheat of each outdoor unit meets a target requirement;

when the degree of superheat of each outdoor unit meets the target requirement, determining whether a difference between an average exhaust temperature of each outdoor unit and an average exhaust temperature of an outdoor unit system reaches a preset value;

when the difference between the average exhaust temperature of each outdoor unit and the average exhaust temperature of the outdoor unit system reaches the preset value, comparing the average exhaust temperature of each outdoor unit is compared with the average exhaust temperature of the outdoor unit system;

controlling an electronic expansion valve to operate according to a result of comparing the average exhaust temperature of each outdoor unit with the average exhaust temperature of the outdoor unit system, to enable the average exhaust temperature of each outdoor unit to approximate to the average exhaust temperature of the outdoor unit system.

In one embodiment, when the difference between the average exhaust temperature of each outdoor unit and the average exhaust temperature of the outdoor unit system reaches the preset value, a second determination as to whether the degree of superheat of the path in which the electronic expansion valve of each outdoor unit is located is greater than a first preset value is performed, so as to compare the average exhaust temperature of each outdoor unit with the average exhaust temperature of the outdoor unit system when the degree of superheat of the path in which the electronic expansion valve of each outdoor unit is located is greater than the first preset value.

In one embodiment, controlling the electronic expansion valve to operate according to the result of comparing the average exhaust temperature of each outdoor unit with the average exhaust temperature of the outdoor unit system, includes:

performing a third determination as to whether the average exhaust temperature of each outdoor unit is greater than the average exhaust temperature of the outdoor unit system;

when the result of the third determination is "yes", increasing the degree of opening of the corresponding electronic expansion valve; and when the result of the third determination is "no", reducing the degree of opening of the corresponding electronic expansion valve.

With the method for controlling the multi-split air conditioner according to the present disclosure, whether the degree of superheat of each outdoor unit meets the target requirement is detected; the first determination as to whether the difference between the average exhaust temperature of each outdoor unit and the average exhaust temperature of the outdoor unit system reaches the preset value is performed when the degree of superheat of each outdoor unit meets the target requirement; the second determination as to whether the degree of superheat of the path in which the electronic expansion valve of each outdoor unit is located is greater than the first preset value is performed when the difference between the average exhaust temperature of each outdoor unit and the average exhaust temperature of the outdoor unit system reaches the preset value; the third determination as to whether the average exhaust temperature of each outdoor unit is greater than the average exhaust temperature of the outdoor unit system is performed when the degree of superheat of the path in which the electronic expansion valve of each outdoor unit is located is greater than the first preset value; the degree of opening of the corresponding electronic expansion valve is increased when the result of the third determination is "yes"; and the degree of opening of the corresponding electronic expansion valve is reduced when the result of the third determination is "no". With the method described in the present disclosure, the problem of uneven distribution of refrigerant in the multi-split air conditioner system is solved, and especially in a multi-split air conditioner system with EVI (enhanced vapor injection), the exhaust temperature of the system is controlled effectively by controlling the degree of opening of the jet electronic expansion valve.

In one embodiment, the multi-split air conditioner includes two outdoor units; controlling the electronic expansion valve to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system includes:

determining whether the degree of opening of the electronic expansion valve of the outdoor unit with a higher average exhaust temperature in the two outdoor units is greater than a maximum degree of opening is determined; and when the degree of opening of the electronic expansion valve is less than the maximum degree of opening, controlling the degree of the opening of the electronic expansion valve to increase from a current degree of opening.

In one embodiment, the multi-split air conditioner includes two outdoor units; controlling the electronic expansion valve to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system includes:

determining whether the degree of opening of the electronic expansion valve of the outdoor unit with a lower average exhaust temperature in the two outdoor units is greater than a minimum degree of opening is determined; and when the degree of opening of the electronic expansion valve is greater than the minimum degree of opening, controlling the degree of opening of the electronic expansion valve to reduce from a current degree of opening.

In one embodiment, controlling the electronic expansion valve to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system includes:

determining whether the degree of opening of the electronic expansion valve of the outdoor unit whose average exhaust temperature is higher than the average exhaust temperature of the outdoor unit system is greater than the maximum degree of opening is determined;

when the degree of opening of the electronic expansion valve is less than the maximum degree of opening, controlling the electronic expansion valve to increase the degree of opening from the current degree of opening.

In one embodiment, controlling the electronic expansion valve to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system includes:

determining whether the degree of opening of the electronic expansion valve of the outdoor unit whose average exhaust temperature is lower than the average exhaust temperature of the outdoor unit system is greater than the minimum degree of opening;

when the degree of opening of the electronic expansion valve is greater than the minimum degree of opening, controlling the electronic expansion valve to reduce the degree of opening from the current degree of opening.

In one embodiment, detecting whether the degree of superheat of each outdoor unit meets the target requirement includes:

obtaining an exhaust temperature of each outdoor unit;

obtaining a lowest exhaust temperature in the exhaust temperatures of all the outdoor units by comparing the exhaust temperatures obtained; and detecting whether the degree of superheat of the outdoor unit corresponding to the lowest exhaust temperature meets the target requirement.

In one embodiment, determining whether the difference between the average exhaust temperature of each outdoor unit and the average exhaust temperature of an outdoor unit system reaches the preset value includes:

obtaining the average exhaust temperature of each outdoor unit and the average exhaust temperature of the outdoor unit system;

obtaining an absolute value of the difference between the average exhaust temperature of each outdoor unit and the average exhaust temperature of the outdoor unit system is obtained according to the average exhaust temperature of each outdoor unit and the average exhaust temperature of the outdoor unit system; and determining whether the absolute value reaches the preset value.

In one embodiment, after performing the second determination as to whether the degree of superheat of the path in which the electronic expansion valve of each outdoor unit is located is greater than the first preset value, the method further includes:

when the degree of superheat of the path in which the electronic expansion valve of each outdoor unit is located is less than or equal to the first preset value, determining whether the degree of superheat of the path in which the electronic expansion valve is located is less than a second preset value; and when the degree of superheat of the path in which the electronic expansion valve is located is less than the second preset value, remaining the current degree of opening of the electronic expansion valve unchanged.

In one embodiment, increasing the degree of opening of the corresponding electronic expansion valve when the result of the third determination is "yes" includes:

when the result of the third determination is "yes", determining whether the degree of opening of the electronic expansion valve of the outdoor unit is less than the maximum degree of opening;

when the degree of opening of the electronic expansion valve of the outdoor unit is less than the maximum degree of opening, controlling the electronic expansion valve to increase the degree of opening from the current degree of opening.

In one embodiment, reducing the degree of opening of the corresponding electronic expansion valve when the result of the third determination is "no" includes:

when the result of the third determination is "no", determining whether the degree of opening of the electronic expansion valve of the outdoor unit is less than the minimum degree of opening;

when the degree of opening of the electronic expansion valve of the outdoor unit is greater than the minimum degree of opening, controlling the electronic expansion valve to reduce the degree of opening from the current degree of opening.

In one embodiment, the method further includes:

obtaining an exhaust temperature of a compressor of each outdoor unit;

determining whether the exhaust temperature of the compressor of each outdoor unit is within a preset range; and when the exhaust temperature of the compressor of the outdoor unit exceeds the preset range, releasing a fault signal.

In one embodiment, the present disclosure further provides a multi-split air conditioner system. The multi-split air conditioner system includes at least two outdoor units, each outdoor unit includes at least one compressor, and the at least two outdoor units constitute an outdoor unit system. The outdoor unit further includes a reversing valve, an outdoor heat exchanger, a gas-liquid separator, an electronic expansion valve, a high-pressure globe valve and a low-pressure globe valve connected on an outdoor unit pipeline. The multi-split air conditioner system further includes: a memory, a processor, and a program for controlling the multi-split air conditioner stored on the memory and capable of running on the processor; when executed by the processor, the program for controlling the multi-split air conditioner implements the steps of the method described above.

In one embodiment, the present disclosure further provides a computer readable storage medium, configured to store a program for controlling a multi-split air conditioner that, when executed by a processor, implement the steps of the method for controlling the multi-split air conditioner described above.

With the method for controlling the multi-split air conditioner according to the present disclosure, whether the degree of superheat of each outdoor unit meets the target requirement is detected; when the degree of superheat of each outdoor unit meets the target requirement, whether a difference between an average exhaust temperature of each outdoor unit and an average exhaust temperature of an outdoor unit system reaches a preset value is determined; when the difference between the average exhaust temperature of each outdoor unit and the average exhaust temperature of the outdoor unit system reaches the preset value, the average exhaust temperature of each outdoor unit is compared with the average exhaust temperature of the outdoor unit system; an electronic expansion valve is controlled to actuate according to the result of comparing the average exhaust temperature of each outdoor unit with the average exhaust temperature of the outdoor unit system, to enable the average exhaust temperature of each outdoor unit to approximate to the average exhaust temperature of the outdoor unit system. With the method of the embodiment, the problem of uneven distribution of refrigerant in the multi-split air conditioner system is solved by controlling the degree of opening of the electronic expansion valve, and especially, the exhaust temperature of the system is effectively controlled in the multi-split air conditioner system.

DETAILED DESCRIPTION

It should be understood that, embodiments described herein are just explanatory, and are not construed to limit the present disclosure.

Figure 1:
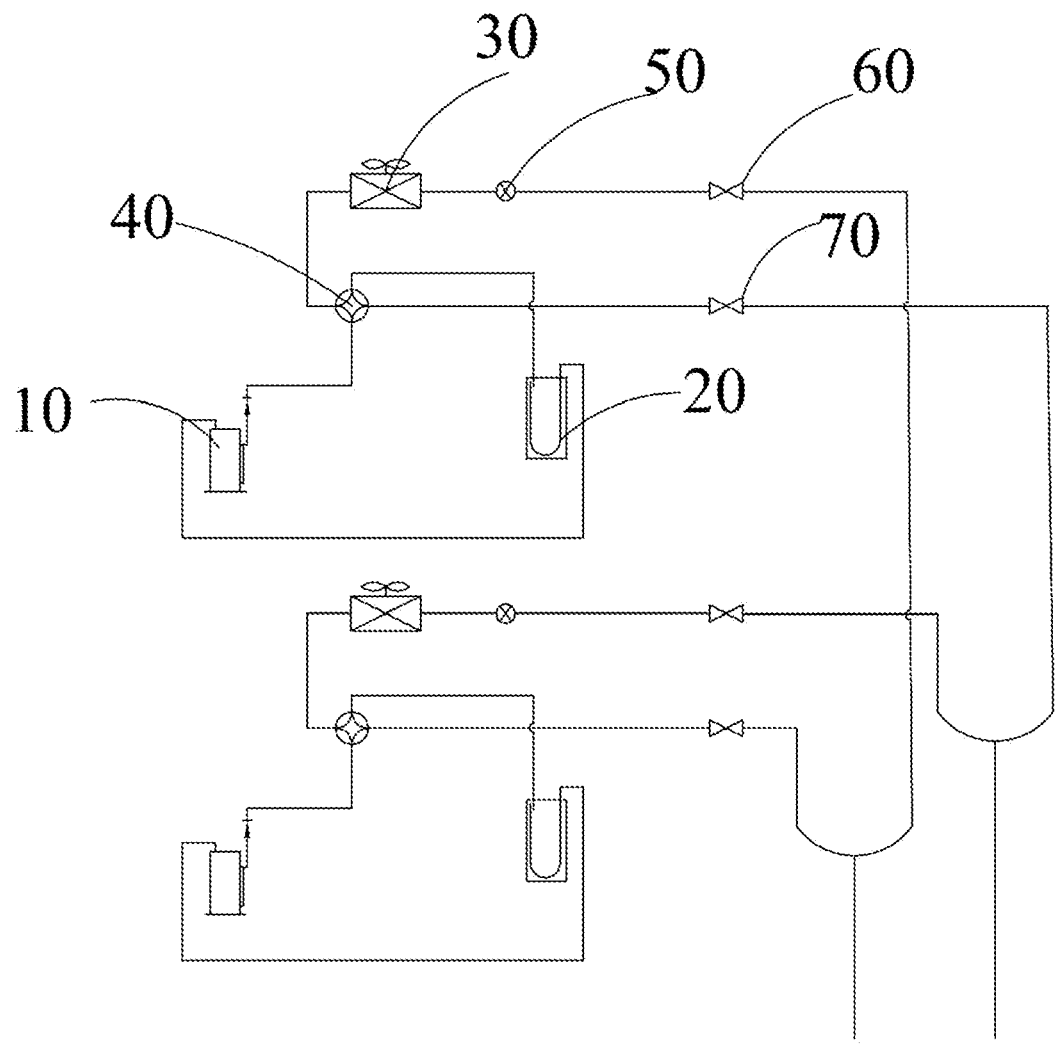
FIG. 1 is a schematic diagram of a multi-split air conditioner system according to an embodiment of the present disclosure.

The present disclosure provides a method for controlling a multi-split air conditioner. The method is applied to a multi-split air conditioner system. The multi-split air conditioner system includes at least two outdoor units connected in parallel and at least two indoor units connected in parallel, the indoor unit and the outdoor unit are connected in series correspondingly. The outdoor unit includes a compressor unit consisting of one, two or more compressors 10. The pipeline structure of the outdoor unit includes a gas-liquid separator 20, the compressor unit, an outdoor heat exchanger 30, a reversing valve 40, an electronic expansion valve 50, a high-pressure globe valve 60 and a low-pressure globe valve 70. The reversing valve 40 is a four-way valve. Referring to FIG. 1, the connection mode of the outdoor unit pipeline is a conventional connection mode in the art, which will not be elaborated here.

Figure 2:
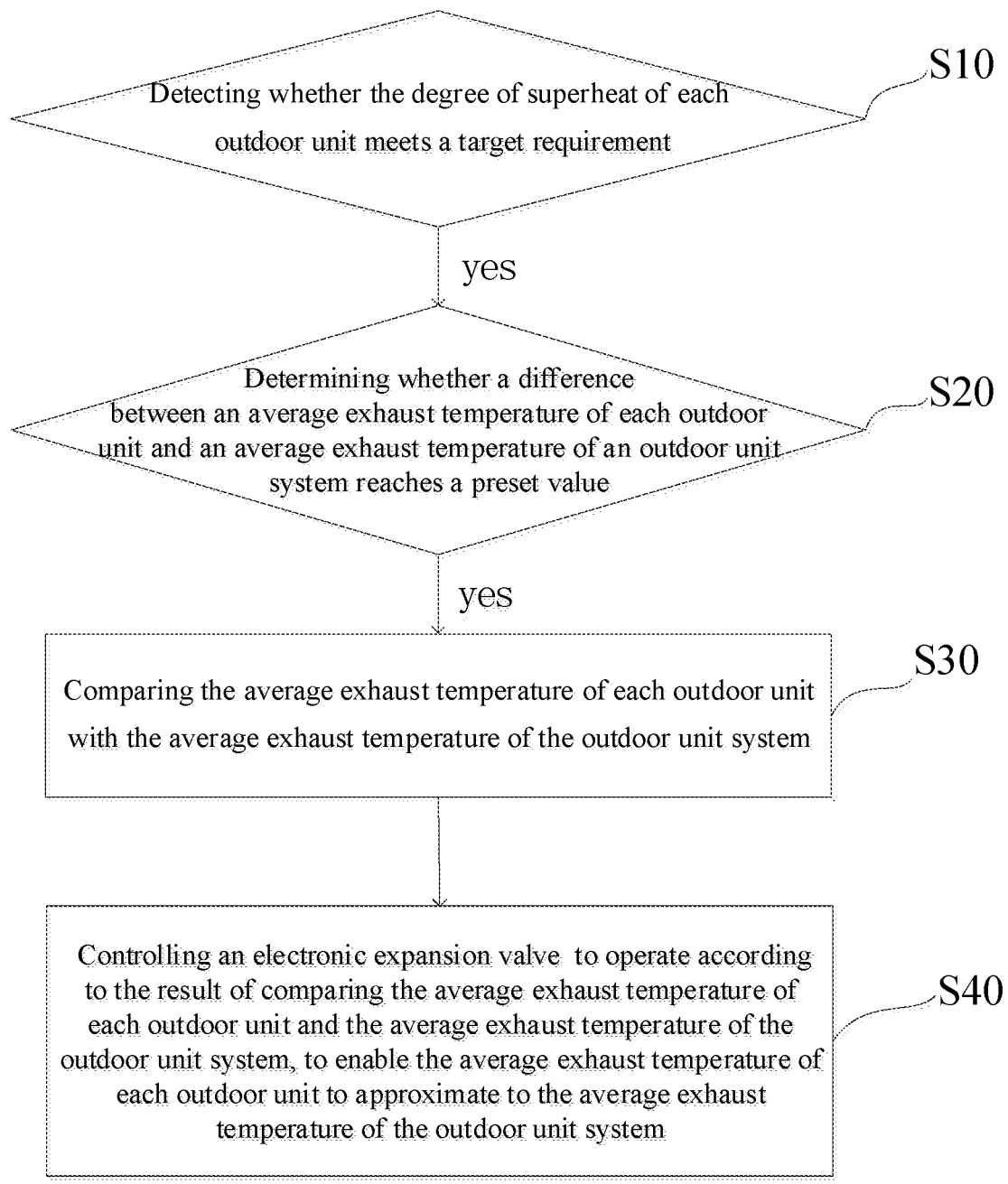
FIG. 2 is a flow chart of a first embodiment of a method for controlling a multi-split air conditioner according to the present disclosure.

Referring to FIG. 2, in a first embodiment, the method for controlling the multi-split air conditioner includes followings.

At step S10, whether the degree of superheat of each outdoor unit meets a target requirement is detected.

In the embodiment, whether the degree of superheat of each outdoor unit meets the target requirement is detected first to determine whether the compressor of each outdoor unit is in a normal working state. When the degree of superheat of the outdoor unit exceeds the target value, it may be due to different resistance of the pipelines through which the refrigerant flows or different indoor loads, which results in an excessively high degree of superheat of the outdoor unit and leaves the compressor of the outdoor unit in an overloaded state. In this case, the flux of the refrigerant should be adjusted first to make the degree of superheat of the outdoor unit reach the target value. Secondly, when the degree of superheat of the outdoor unit is less than the target value, it may be due to the refrigerant flowing into the compressor in a gas-liquid two-phase state, causing damage to the compressor. Therefore, it is necessary to reduce the refrigerant flux of the compressor first, so as to avoid the refrigerant flowing into the compressor in the gas-liquid two-phase state and causing damage to the whole system. Only when the degree of superheat of each outdoor unit meets the target requirement, subsequent operation can be continued, otherwise it is necessary to adjust the degree of superheat of the compressor to meet the target requirement.

At step S20, when the degree of superheat of each outdoor unit meets the target requirement, whether a difference between an average exhaust temperature of each outdoor unit and an average exhaust temperature of an outdoor unit system reaches a preset value is determined.

When the degree of superheat of each outdoor unit meets the target requirement, whether the difference between the average exhaust temperature of each outdoor unit and the average exhaust temperature of the outdoor unit system reaches the preset value is further determined. The preset value may be set based on demands. When the difference between the average exhaust temperature of each outdoor unit and the average exhaust temperature of the outdoor unit system is below the preset value, it indicates that the different between the average exhaust temperature of each outdoor unit and the average exhaust temperature of the outdoor unit system is small, which belongs to an acceptable fluctuation range, and thus there is no need to adjust the operation of the outdoor unit in this case. However, when the difference between the average exhaust temperature of each outdoor unit and the average exhaust temperature of the outdoor unit system exceeds the preset value, it indicates that the average exhaust temperature of each outdoor unit deviates heavily from the average exhaust temperature of the outdoor unit system, which may affect the normal operation of the outdoor unit, and therefore, it is necessary to take measures to adjust the exhaust temperature to make it approximate to the average exhaust temperature of the outdoor unit system.

At step S30, when the difference between the average exhaust temperature of each outdoor unit and the average exhaust temperature of the outdoor unit system reaches the preset value, the average exhaust temperature of each outdoor unit is compared with the average exhaust temperature of the outdoor unit system.

Further, the exhaust temperature of the compressor of each outdoor unit is obtained and the average exhaust temperature of the outdoor unit system is calculated.

The average exhaust temperature of each outdoor unit is the average of the exhaust temperatures of all compressors in each outdoor unit. For example, when there are three outdoor units, the average exhaust temperatures of the three outdoor units are set as TP1, TP2 and TP3, each outdoor unit includes two compressors, the exhaust temperatures of the compressors are TP1C1, TP1C2, TP2C1, TP2C2, TP3C1 and TP3C2 respectively, then the average exhaust temperatures of the three outdoor units are TP1=(TP1C1+TP1C2)/2, TP2=(TP2C1+TP2C2)/2, TP3=(TP3C1+TP3C2)/2. The average exhaust temperature of the outdoor unit system is the average of the average exhaust temperatures of the three outdoor units. Let the average exhaust temperature of the outdoor unit system be set as TP, then TP=(TP1+TP2+TP3)/3.

At step S40, the electronic expansion valve is controlled to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system.

Further, the calculated average exhaust temperatures of respective outdoor units are compared with each other. In one embodiment, when there are only two outdoor units, the calculated average exhaust temperatures of the two outdoor units can be directly compared with each other. The degree of opening of the electronic expansion valve of the outdoor unit with a higher average exhaust temperature is increased so as to increase the refrigerant therein, further to decrease the exhaust temperature thereof. The degree of opening of the electronic expansion valve of the outdoor unit with a lower average exhaust temperature is decreased so as to reduce the refrigerant therein, further to increase the exhaust temperature thereof. Of course, in the case of multiple outdoor units, pairwise comparison is cumbersome, and in this case, the average exhaust temperature of the entire outdoor unit system can be calculated directly based on the average exhaust temperatures of respective outdoor units, and further, the average exhaust temperature of each outdoor unit is compared with the size of the average exhaust temperature of the outdoor unit system, and the degree of opening of the electronic expansion valve is adjusted according to the result of comparing, such that the exhaust temperature of the outdoor unit approximates to the average exhaust temperature of the whole outdoor unit system, further realizing an even distribution of the refrigerant in the whole outdoor unit system.

In this embodiment, whether the degree of superheat of each outdoor unit meets the target requirement is detected; when the degree of superheat of each outdoor unit meets the target requirement, whether the difference between the average exhaust temperature of each outdoor unit and the average exhaust temperature of an outdoor unit system reaches the preset value is determined; when the difference between the average exhaust temperature of each outdoor unit and the average exhaust temperature of the outdoor unit system reaches the preset value, the average exhaust temperature of each outdoor unit is obtained and the average exhaust temperature of the outdoor unit system is calculated; the average exhaust temperature of each outdoor unit is compared with the average exhaust temperature of the outdoor unit system; the electronic expansion valve is controlled to operate according to the result of comparing the average exhaust temperature of each outdoor unit with the average exhaust temperature of the outdoor unit system, to enable the average exhaust temperature of each outdoor unit to approximate to the average exhaust temperature of the outdoor unit system. With the method of the embodiment, the problem of the uneven distribution of refrigerant in the multi-split air conditioner system is solved by controlling the degree of opening of the electronic expansion valve, and especially in a multi-split air conditioner system with EVI, the exhaust temperature of the system is controlled effectively.

Figure 3:
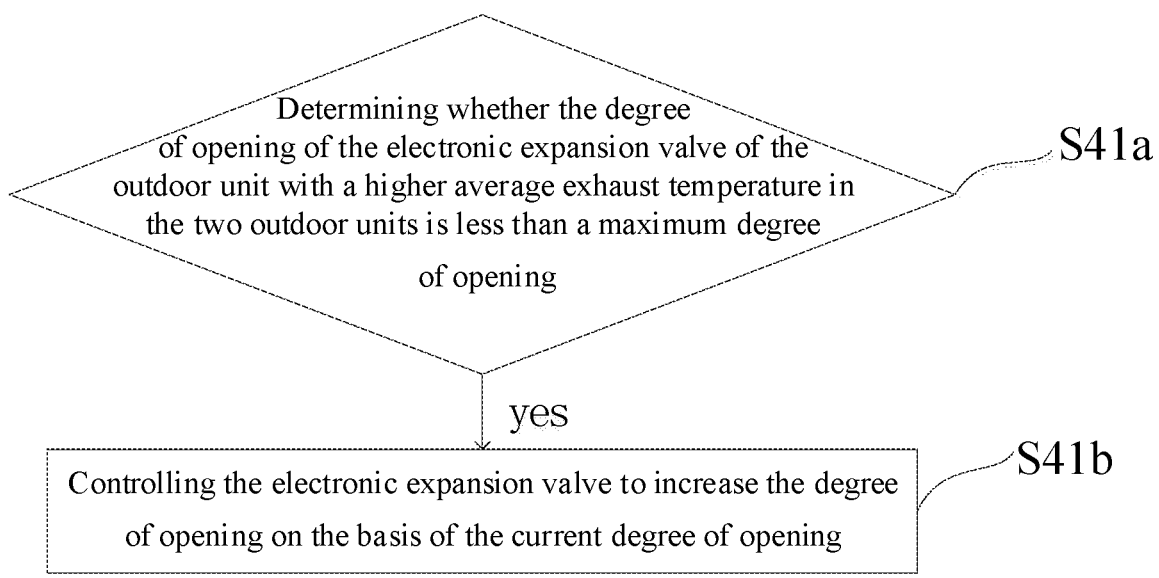
FIG. 3 is a flow chart of a second embodiment of a method for controlling a multi-split air conditioner according to the present disclosure.

Furthermore, referring to FIG. 3, based on the first embodiment of the method for controlling multi-split air conditioner according to the present disclosure, in a second embodiment of the method for controlling multi-split air conditioner according to the present disclosure, step S40 includes followings.

At step S41a, whether the degree of opening of the electronic expansion valve of the outdoor unit with a higher average exhaust temperature in the two outdoor units is less than a maximum degree of opening is determined.

At step S41b, when the degree of opening of the electronic expansion valve is less than the maximum degree of opening, the degree of opening of the electronic expansion valve is controlled to increase from the current degree of opening.

In the embodiment, there are only two outdoor units of the multi-split air conditioner, and in the case of only two outdoor units, the average exhaust temperatures of the two outdoor units can be compared with each other directly to regulate the degree of opening of the electronic expansion valve.

In one embodiment, the average exhaust temperatures of the two outdoor units are calculated, and the average exhaust temperatures of two outdoor units are compared. Further, whether the current degree of opening of the electronic expansion valve of the outdoor unit with a relatively higher average exhaust temperature reaches the maximum degree of opening it can reach is determined. When the electronic expansion valve reaches the maximum degree of opening it can reach, it indicates that the electronic expansion valve cannot increase the degree of opening any more at this time. Therefore, only when the current degree of opening of the electronic expansion valve has not reached the maximum degree of opening, the electronic expansion valve can be controlled to continue increasing the degree of opening.

Therefore, when the degree of opening of the electronic expansion valve has not reached the maximum degree of opening, the electronic expansion valve is controlled to increase the degree of opening on the basis of the current degree of opening, such that the refrigerant volume of the compressor of the outdoor unit is increased and the exhaust temperature thereof is reduced.

In the embodiment, when there are only two outdoor units, the average exhaust temperatures of the two outdoor units can be compared with each other directly, and by determining whether the degree of opening of the electronic expansion valve with the higher average exhaust temperature reaches the maximum degree of opening, it can be further determined whether the electronic expansion valve can continue opening. In this way, the accuracy of controlling the electronic expansion valve is improved, and the electronic expansion valve and the whole system are protected.

Figure 4:
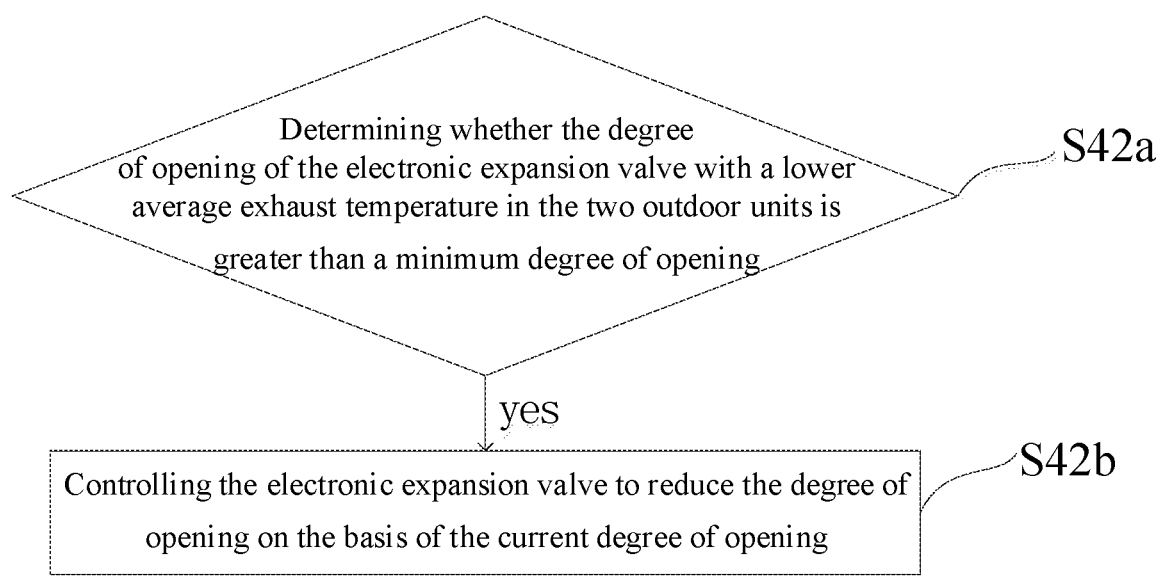
FIG. 4 is a flow chart of a third embodiment of a method for controlling a multi-split air conditioner according to the present disclosure.

Furthermore, referring to FIG. 4, based on the second embodiment of the method for controlling the multi-split air conditioner according to the present disclosure, in a third embodiment of the method for controlling the multi-split air conditioner according to the present disclosure, step S40 includes followings.

At step S42a, whether the degree of opening of the electronic expansion valve with a lower average exhaust temperature in the two outdoor units is greater than a minimum degree of opening is determined.

At step S42b, when the degree of opening of the electronic expansion valve is greater than the minimum degree of opening, the electronic expansion valve is controlled to reduce the degree of opening on the basis of the current degree of opening.

In the embodiment, there are only two outdoor units of the multi-split air conditioner, and in the case of only two outdoor units, the average exhaust temperatures of the two outdoor units can be compared with each other directly to regulate the degree of opening of the electronic expansion valve.

In one embodiment, the average exhaust temperatures of the two outdoor units are calculated, and the average exhaust temperatures of two outdoor units are compared. Further, whether the current degree of opening of the electronic expansion valve of the outdoor unit with a relatively lower average exhaust temperature reaches the minimum degree of opening is determined. When the electronic expansion valve reaches the minimum degree of opening it can reach, it indicates that the electronic expansion valve cannot reduce the degree of opening any more at this time. Therefore, only when the current the degree of opening of the electronic expansion valve has not reached the minimum degree of opening, the electronic expansion valve can be controlled to continue reducing the degree of opening.

Therefore, when the degree of opening of the electronic expansion valve has not reached the minimum degree of opening, the electronic expansion valve is controlled to reduce the degree of opening on the basis of the current degree of opening, such that the refrigerant volume of the compressor of the outdoor unit is reduced and the exhaust temperature thereof is increased.

In this embodiment, when there are only two outdoor units, the average exhaust temperatures of the two outdoor units can be compared with each other directly, and by determining whether the degree of opening of the electronic expansion valve with the lower average exhaust temperature reaches the minimum degree of opening, it can be further determined whether the electronic expansion valve can continue opening. In this way, the accuracy of controlling the electronic expansion valve is improved, and the electronic expansion valve and the whole system are protected.

Figure 5:
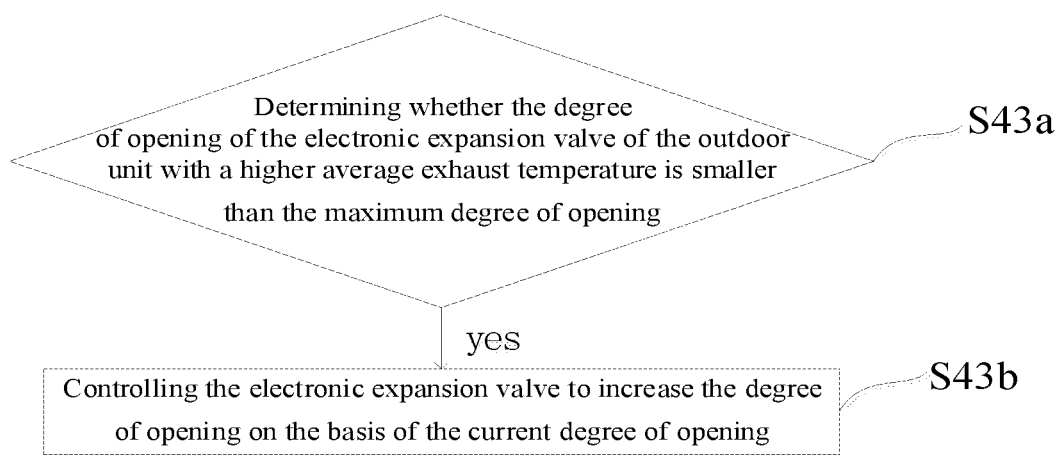
FIG. 5 is a flow chart of a fourth embodiment of a method for controlling a multi-split air conditioner according to the present disclosure.

Furthermore, referring to FIG. 5, in a fourth embodiment of the method for controlling the multi-split air conditioner according to the present disclosure, step S40 includes followings.

At step S43a, whether the degree of opening of the electronic expansion valve of the outdoor unit whose average exhaust temperature is higher than the average exhaust temperature of the outdoor unit system is greater than the maximum degree of opening is determined.

At step S43b, when the degree of opening of the electronic expansion valve is less than the maximum degree of opening, the electronic expansion valve is controlled to increase the degree of opening on the basis of the current degree of opening.

In the embodiment, the degree of opening of the electronic expansion valve is controlled by determining the relationship between the average exhaust temperature of the outdoor unit and the average exhaust temperature of the outdoor unit system.

In one embodiment, the average exhaust temperature of each outdoor unit and the average exhaust temperature of the outdoor unit system are compared first. When the average exhaust temperature of the outdoor unit is greater than the average exhaust temperature of the outdoor unit system, whether the electronic expansion valve of the outdoor unit reaches its maximum degree of opening is detected. When it is detected that the electronic expansion valve has not reached the maximum degree of opening, the electronic expansion valve is controlled to increase the degree of opening on the basis of the current degree of opening, such that refrigerant volume of the compressor of the outdoor unit is increased and the exhaust temperature thereof is reduced.

It can be understood that, the number of outdoor units in the embodiment may be two, three or more than three, which is not limited here.

In this embodiment, by comparing the average exhaust temperature of the outdoor unit with the average exhaust temperature of the outdoor unit system, and controlling the degree of opening of the electronic expansion valve according to the comparing result, the even distribution of refrigerant in the whole multi-split air conditioner system can be achieved effectively.

Figure 6:
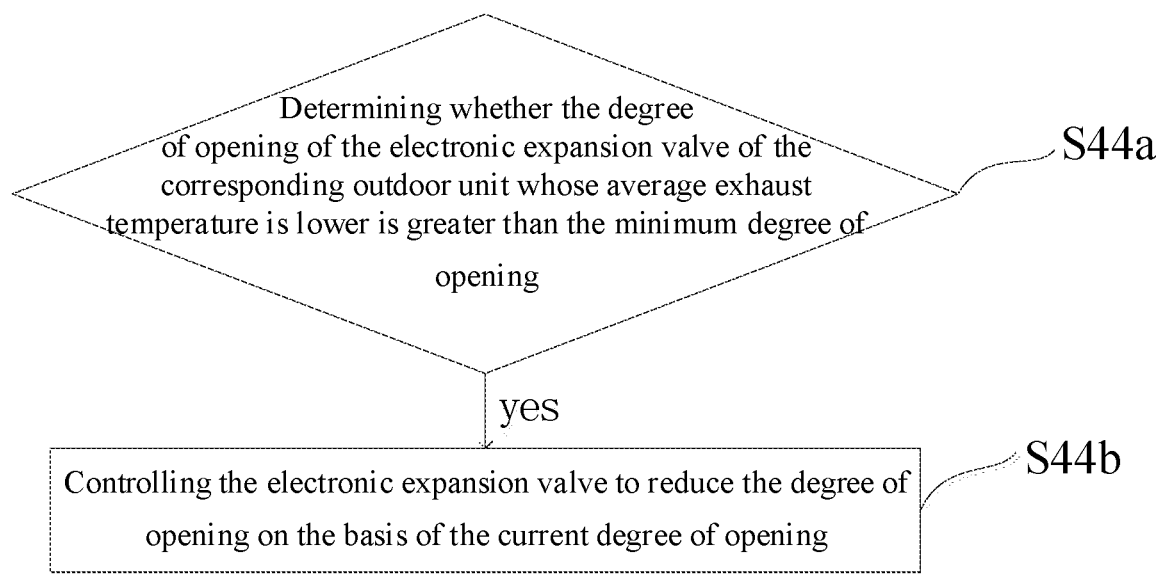
FIG. 6 is a flow chart of a fifth embodiment of a method for controlling a multi-split air conditioner according to the present disclosure.

Furthermore, referring to FIG. 6, in a fifth embodiment of the method for controlling the multi-split air conditioner according to the present disclosure, step S40 includes followings.

At step S44a, whether the degree of opening of the electronic expansion valve of the outdoor unit whose average exhaust temperature is lower than the average exhaust temperature of the outdoor unit system is greater than the minimum degree of opening is determined.

At step S44b, when the degree of opening of the electronic expansion valve is greater than the minimum degree of opening, the electronic expansion valve is controlled to reduce the degree of opening on the basis of the current degree of opening.

In this embodiment, the degree of opening of the electronic expansion valve is controlled by determining the relationship between the average exhaust temperature of the outdoor unit and the average exhaust temperature of the outdoor unit system.

In one embodiment, the average exhaust temperature of each outdoor unit and the average exhaust temperature of the outdoor unit system are compared first. When the average exhaust temperature of the outdoor unit is greater than the average exhaust temperature of the outdoor unit system, whether the electronic expansion valve of the outdoor unit reaches its maximum degree of opening is detected. When it is detected that the electronic expansion valve has not reached the maximum degree of opening, the electronic expansion valve is controlled to increase the degree of opening on the basis of the current degree of opening, such that the refrigerant volume of the compressor of the outdoor unit is increased and the exhaust temperature thereof is reduced.

It can be understood that, the number of outdoor units in this embodiment may be two, three or more than three, which is not limited here.

In this embodiment, by comparing the average exhaust temperature of the outdoor unit with the average exhaust temperature of the outdoor unit system and controlling the degree of opening of the electronic expansion valve according to the comparing result, the even distribution of refrigerant in the whole multi-split air conditioner system can be achieved effectively.

Figure 7:
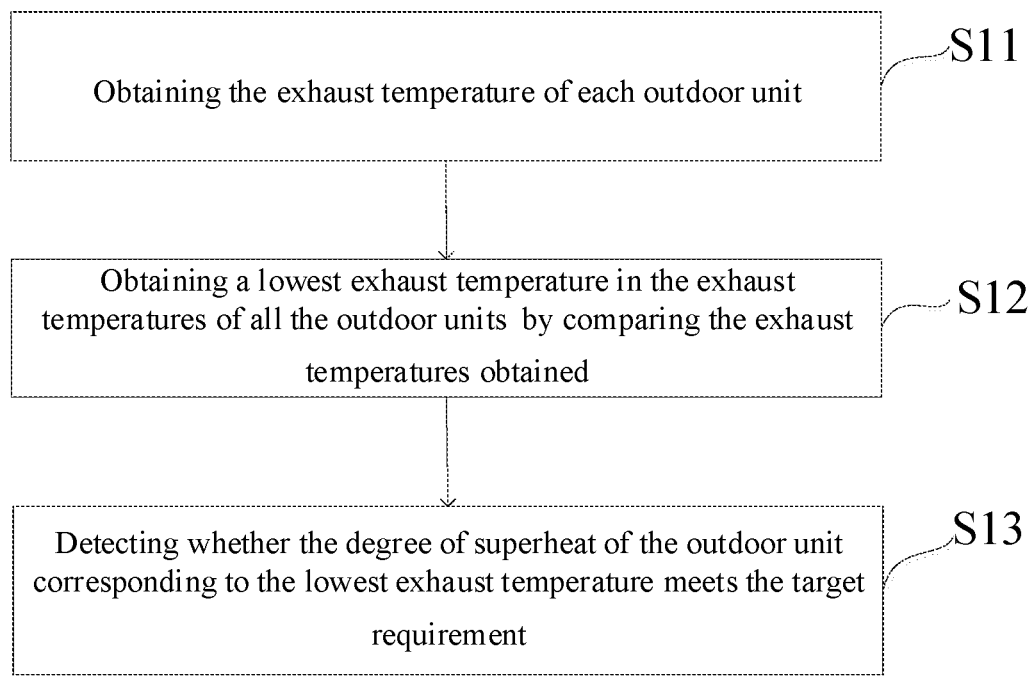
FIG. 7 is a flow chart of a sixth embodiment of a method for controlling a multi-split air conditioner according to the present disclosure.

Furthermore, referring to FIG. 7, in a sixth embodiment of the method for controlling the multi-split air conditioner according to the present disclosure, step S10 includes followings.

At step S11, the exhaust temperature of each outdoor unit is obtained.

At step S12, a lowest exhaust temperature in the exhaust temperatures of all the outdoor units is obtained by comparing the exhaust temperatures obtained.

At step S13, whether the degree of superheat of the outdoor unit corresponding to the lowest exhaust temperature meets the target requirement is detected.

In this embodiment, the exhaust temperature of each outdoor unit is obtained, the lowest exhaust temperature of all exhaust temperatures is further obtained by comparing the obtained exhaust temperatures, and furthermore, whether the degree of superheat of the outdoor unit corresponding to the lowest exhaust temperature meets the target requirement is determined. When the degree of superheat of the outdoor unit corresponding to the lowest exhaust temperature meets the target requirement, it indicates that the degrees of superheat of other outdoor units whose exhaust temperatures are higher than the lowest exhaust temperature can also meet the target requirement. Thus, it is only necessary to determine whether the degree of superheat of the outdoor unit corresponding to the lowest exhaust temperature meets the target requirement.

It should be noted that, the above obtained exhaust temperature of each outdoor unit refers to the average of the exhaust temperatures of all the compressors of each outdoor unit, and the lowest exhaust temperature is obtained by comparing the exhaust temperatures of all the outdoor units.

In this embodiment, the lowest exhaust temperature of the exhaust temperatures of all the outdoor units is obtained, and whether the degree of superheat of the outdoor unit corresponding to the lowest exhaust temperature meets the target requirement is determined, and when the degree of superheat of the outdoor unit corresponding to the lowest exhaust temperature meets the target requirement, it can be determined that the degrees of superheat of other outdoor units can also meet the target requirement. In this way, there is no need to determine the degrees of superheat of all the outdoor units, improving the operating efficiency.

Figure 8:
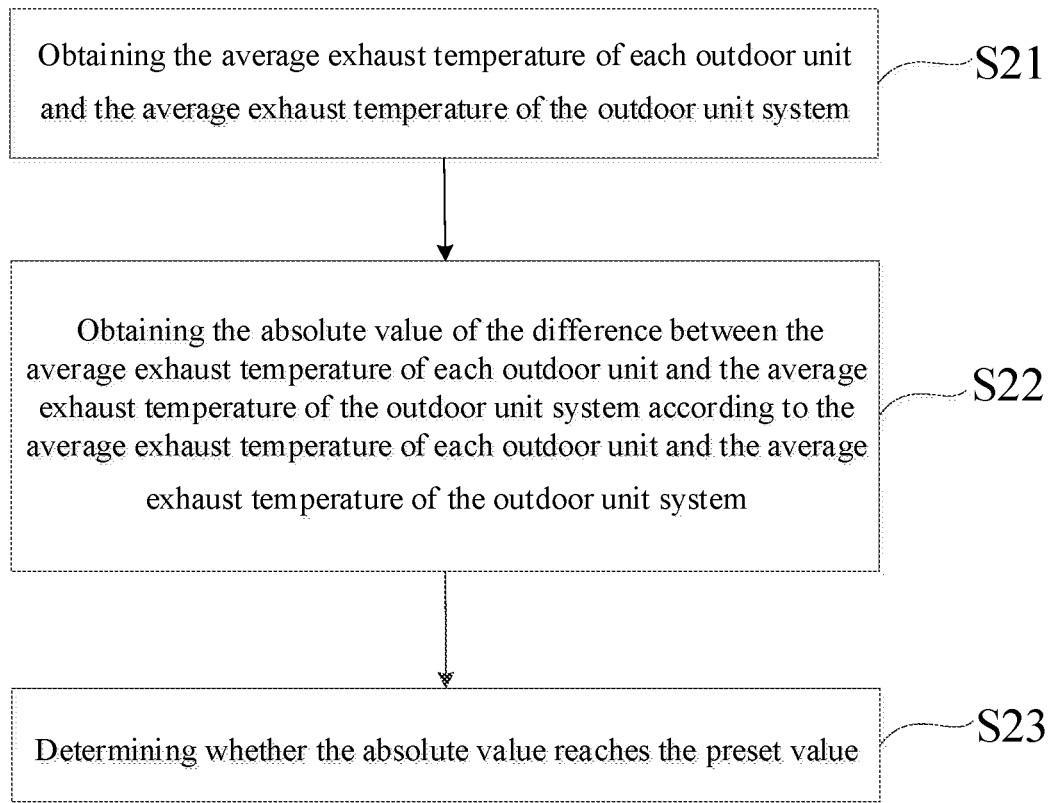
FIG. 8 is a flow chart of a seventh embodiment of a method for controlling a multi-split air conditioner according to the present disclosure.

Furthermore, referring to FIG. 8, in a seventh embodiment of the method for controlling the multi-split air conditioner according to the present disclosure, step S20 includes followings.

At step S21, the average exhaust temperature of each outdoor unit and the average exhaust temperature of the outdoor unit system are obtained.

At step S22, the absolute value of the difference between the average exhaust temperature of each outdoor unit and the average exhaust temperature of the outdoor unit system is obtained according to the average exhaust temperature of each outdoor unit and the average exhaust temperature of the outdoor unit system.

At step S23, whether the absolute value reaches the preset value is determined.

In this embodiment, whether the absolute value of the difference between the average exhaust temperature of each outdoor unit and the average exhaust temperature of the outdoor unit system reaches the preset value is determined before comparing the average exhaust temperature of each outdoor unit and the average exhaust temperature of the outdoor unit system. When the preset value is not reached, it indicates that the average exhaust temperature of the outdoor unit differs little from the average exhaust temperature of the outdoor unit system, and the difference between the two is within the range of fluctuations. When the absolute value of the difference between the average exhaust temperature of the outdoor unit and the average exhaust temperature of the outdoor unit system reaches the preset value, the average exhaust temperature of the outdoor unit and the average exhaust temperature of the outdoor unit system are compared.

The preset range may be set according to the requirement of the system, and the preset range may allow that the average exhaust temperature of each outdoor unit can have a fluctuating value between the upper and lower limits of the average exhaust temperature of the outdoor unit system, so as to ensure the reliability of system control.

Figure 9:
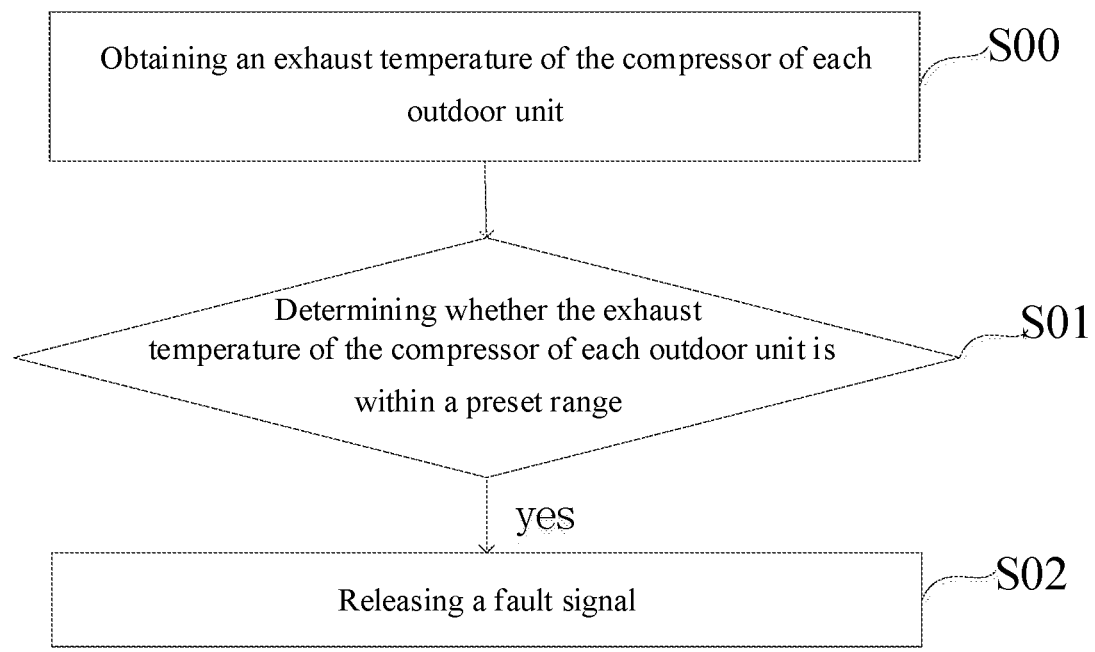
FIG. 9 is a flow chart of a method for controlling a multi-split air conditioner according to an embodiment of the present disclosure.

Furthermore, referring to FIG. 9, in another embodiment, the method further includes followings.

At step S00, an exhaust temperature of the compressor of each outdoor unit is obtained.

At step S01, whether the exhaust temperature of the compressor of each outdoor unit is within a preset range is determined.

At step S02, when the exhaust temperature of the compressor of the outdoor unit exceeds the preset range, a fault signal is released.

In this embodiment, the exhaust temperature of the compressor of each outdoor unit is obtained, and whether the exhaust temperature of each outdoor compressor is within the preset range is further determined. When the exhaust temperature of the compressor exceeds the preset range, a fault signal is released. This preset range is the exhaust temperature range of the compressor under a normal working condition, which can be set according to the actual situation of the system.

By detecting whether the exhaust temperature of each compressor is within a normal preset range, and releasing a timely warning in case of a compressor failure, the compressor is prevented from continuing working in the fault state and further damage is avoided.

Figure 10:
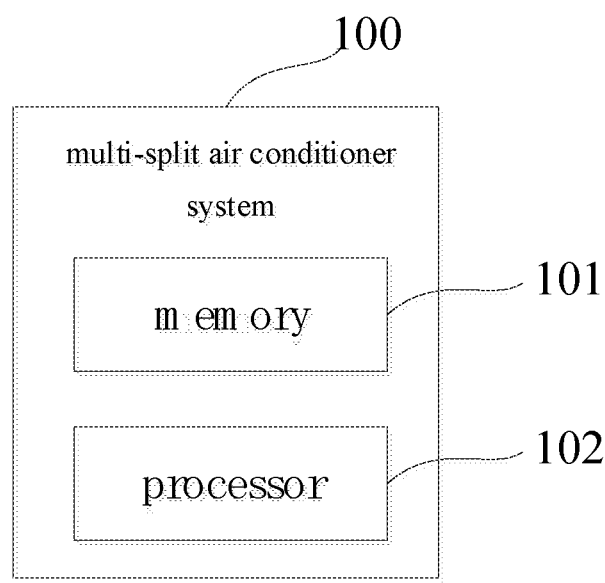
FIG. 10 is a block diagram of a multi-split air conditioner system according to the present disclosure.

The present disclosure further provides a multi-split air conditioner system, referring to FIG. 10 and FIG. 1. The method is applied to the multi-split air conditioner system. The multi-split air conditioner system includes at least two outdoor units connected in parallel and at least two indoor units connected in parallel, in which the indoor unit and the outdoor unit are connected in series correspondingly. The outdoor unit includes one, two or more compressors 10, which constitute a compressor unit. The pipeline structure of the outdoor unit includes a gas-liquid separator 20, the compressor unit, an outdoor heat exchanger 30, a reversing valve 40, an electronic expansion valve 50, a high-pressure globe valve 60 and a low-pressure globe valve 70; the reversing valve 40 is a four-way valve. Referring to FIG. 1, the connection mode of the outdoor unit pipeline is a conventional connection mode in the art, which will not be elaborated here. The multi-split air conditioner system 100 further includes: a memory 101, a processor 102 and a program for controlling a multi-split air conditioner stored on the memory 101 and capable of running on the processor 102. When executed by the processor 102, the program for controlling the multi-split air conditioner implements the steps of the method described below:

detecting whether the degree of superheat of each outdoor unit meets a target requirement;

when the degree of superheat of each outdoor unit meets the target requirement, determining whether a difference between an average exhaust temperature of each outdoor unit and an average exhaust temperature of an outdoor unit system reaches a preset value;

when the difference between the average exhaust temperature of each outdoor unit and the average exhaust temperature of the outdoor unit system reaches the preset value, comparing the average exhaust temperature of each outdoor unit with the average exhaust temperature of the outdoor unit system;

controlling an electronic expansion valve to operate according to a result of comparing the average exhaust temperature of each outdoor unit with the average exhaust temperature of the outdoor unit system, to enable the average exhaust temperature of each outdoor unit to approximate to the average exhaust temperature of the outdoor unit system.

In this embodiment, whether the degree of superheat of each outdoor unit meets the target requirement is detected first to determine whether a compressor of each outdoor unit is in a normal working state. When the degree of superheat of the outdoor unit exceeds the target value, it may be due to the different resistance of the pipelines through which the refrigerant flows or the different indoor loads, which results in an excessively high degree of superheat of the outdoor unit and leaves the compressor of the outdoor unit in an overloaded state. At this time, the flux of the refrigerant should be adjusted to make the degree of superheat of the outdoor unit reach the target value. Secondly, when the degree of superheat of the outdoor unit is less than the target value, it may be due to the refrigerant flowing into the compressor in a gas-liquid two-phase state, causing damage to the compressor; therefore, it is necessary to reduce the refrigerant flux of the compressor first, so as to avoid the refrigerant flowing into the compressor in the gas-liquid two-phase state and causing damage to the whole system. Only when the degree of superheat of each outdoor unit meets the target requirement, subsequent operation can be continued, otherwise it is necessary to adjust the degree of superheat of the compressor to meet the target requirement.

When the degree of superheat of each outdoor unit meets the target requirement, whether the difference between the average exhaust temperature of each outdoor unit and the average exhaust temperature of the outdoor unit system reaches the preset value is further determined. The preset value can be set based on demands. When the difference between the average exhaust temperature of each outdoor unit and the average exhaust temperature of the outdoor unit system is below the preset value, it indicates that the average exhaust temperature of each outdoor unit at this time differs little from the average exhaust temperature of the outdoor unit system, which belongs to the acceptable fluctuation range, and then there is no need to adjust the operation of the outdoor unit. However, when the difference between the average exhaust temperature of each outdoor unit and the average exhaust temperature of the outdoor unit system exceeds the preset value, it indicates that the average exhaust temperature of each outdoor unit deviates heavily from the average exhaust temperature of the outdoor unit system, which may affect the normal operation of the outdoor unit, and therefore, it is necessary to take measures to adjust the exhaust temperature to make it approximate to the average exhaust temperature of the outdoor unit system.

Further, the exhaust temperature of the compressor of each outdoor unit is obtained and the average exhaust temperature of the outdoor unit system is calculated.

The average exhaust temperature of each outdoor unit is the average of the exhaust temperatures of all compressors in each outdoor unit. For example, when there are three outdoor units, the average exhaust temperatures of the three outdoor units are set as TP1, TP2 and TP3, each outdoor unit includes two compressors, the exhaust temperatures of the compressors are TP1C1, TP1C2, TP2C1, TP2C2, TP3C1 and TP3C2 respectively, then the average exhaust temperatures of the three outdoor units are TP1=(TP1C1+TP1C2)/2, TP2=(TP2C1+TP2C2)/2, TP3=(TP3C1+TP3C2)/2. The average exhaust temperature of the outdoor unit system is the average of the average exhaust temperatures of the three outdoor units. Let the average exhaust temperature of the outdoor unit system is set as TP, then TP=(TP1+TP2+TP3)/3.

Further, the average exhaust temperatures of respective outdoor units obtained according to the calculation are compared with each other. In one embodiment, when there are only two outdoor units, the calculated average exhaust temperatures of the two outdoor units can be directly compared with each other. The degree of opening of the electronic expansion valve of the outdoor unit with a higher average exhaust temperature is increased so as to increase the refrigerant therein, further to decrease the exhaust temperature thereof; the degree of opening of the electronic expansion valve of the outdoor unit with a lower average exhaust temperature is decreased so as to reduce the refrigerant therein, further to increase the exhaust temperature thereof. Of course, in the case of multiple outdoor units, pairwise comparison is cumbersome, and in this case, based on the average exhaust temperature of each outdoor unit, the average exhaust temperature of the entire outdoor unit system can be directly calculated. Furthermore, the average exhaust temperature of each outdoor unit is compared with the average exhaust temperature of the outdoor unit system, and the degree of opening of the electronic expansion valve is adjusted according to the comparing result, such that the exhaust temperature of the outdoor unit approximates to the average exhaust temperature of the entire outdoor unit system, further realizing an even distribution of the refrigerant in the whole outdoor unit system.

In this embodiment, whether the degree of superheat of each outdoor unit meets the target requirement is detected; when the degree of superheat of each outdoor unit meets the target requirement, the average exhaust temperature of each outdoor unit is obtained and the average exhaust temperature of the outdoor unit system is calculated; the average exhaust temperature of each outdoor unit is compared with the average exhaust temperature of the outdoor unit system; according to the comparing result of the average exhaust temperature of each outdoor unit, the degree of opening of the electronic expansion valve of the outdoor unit is detected, and the electronic expansion valve is controlled to operate to enable the average exhaust temperature of each outdoor unit to approximate to the average exhaust temperature of the outdoor unit system. With the method of this embodiment, the problem of the uneven distribution of refrigerant in the multi-split air conditioner system is solved, especially in a multi-split air conditioner system with EVI, the exhaust temperature of the system is controlled effectively by controlling the degree of opening of the electronic expansion valve.

Further, in an embodiment, the program for controlling the multi-split air conditioner, when executed by the processor, implements the following method steps:

determining whether the degree of opening of the electronic expansion valve of the outdoor unit with a higher average exhaust temperature in the two outdoor units is greater than a maximum degree of opening; and when the degree of opening of the electronic expansion valve is less than the maximum degree of opening, controlling the electronic expansion valve to increase the degree of opening on the basis of the current degree of opening.

In this embodiment, there are only two outdoor units of the multi-split air conditioner, and in the case of only two outdoor units, the average exhaust temperatures of the two outdoor units can be compared with each other directly to regulate the degree of opening of the electronic expansion valve.

In one embodiment, the average exhaust temperatures of the two outdoor units are calculated, and the average exhaust temperatures of two outdoor units are compared. Further, whether the current degree of opening of the electronic expansion valve of the outdoor unit with a relatively higher average exhaust temperature reaches the maximum degree of opening it can reach is determined. When the electronic expansion valve reaches the maximum degree of opening it can reach, it indicates that the electronic expansion valve cannot increase the degree of opening any more at this time. Therefore, only when the current the degree of opening of the electronic expansion valve has not reached the maximum degree of opening, the electronic expansion valve can be controlled to continue increasing the degree of opening.

Therefore, when the degree of opening of the electronic expansion valve has not reached the maximum degree of opening, the electronic expansion valve is controlled to increase the degree of opening on the basis of the current degree of opening, such that the refrigerant volume of the compressor of the outdoor unit is increased, thereby reducing its exhaust temperature.

In this embodiment, when there are only two outdoor units, the average exhaust temperatures of the two outdoor units can be compared with each other directly, and by determining whether the degree of opening of the electronic expansion valve with a higher average exhaust temperature reaches the maximum degree of opening, it can be further determined whether the electronic expansion valve can continue to be opened. In this way, the accuracy of controlling of the electronic expansion valve is improved, and the electronic expansion valve and the whole system are protected.

Further, in an embodiment, the program for controlling the multi-split air conditioner, when executed by the processor, implements the following method steps:

determining whether the degree of opening of the electronic expansion valve of the outdoor unit with a lower average exhaust temperature in the two outdoor units is greater than the minimum degree of opening; and when the degree of opening of the electronic expansion valve is greater than the minimum degree of opening, controlling the electronic expansion valve to reduce the degree of opening on the basis of the current degree of opening.

In this embodiment, there are only two outdoor units of the multi-split air conditioner, and in the case of only two outdoor units, the average exhaust temperatures of the two outdoor units can be compared with each other directly to regulate the degree of opening of the electronic expansion valve.

In one embodiment, the average exhaust temperatures of the two outdoor units are calculated, and the sizes of the average exhaust temperatures of two outdoor units are compared. Further, whether the current degree of opening of the electronic expansion valve of the outdoor unit with a relatively lower average exhaust temperature reaches the minimum degree of opening it can reach is determined. When the electronic expansion valve reaches the minimum degree of opening it can reach, it indicates that the electronic expansion valve cannot reduce the degree of opening any more at this time. Therefore, only when the current degree of opening of the electronic expansion valve has not reached the minimum degree of opening, the electronic expansion valve can be controlled to continue reducing the degree of opening.

Therefore, when the degree of opening of the electronic expansion valve has not reached the minimum degree of opening, the electronic expansion valve is controlled to reduce the degree of opening on the basis of the current degree of opening so as to reduce the refrigerant volume of the compressor of the outdoor unit and to increase its exhaust temperature.

When there are only two outdoor units in the embodiment, the average exhaust temperatures of the two outdoor units can be compared with each other directly, and by determining whether the degree of opening of the electronic expansion valve with a lower average exhaust temperature reaches the minimum degree of opening, it can be further determined whether the electronic expansion valve can continue to be opened. In this way, the accuracy of controlling of the electronic expansion valve is improved, and the electronic expansion valve and the whole system are protected.

Further, in other embodiments, the program for controlling the multi-split air conditioner, when executed by the processor, implements the following method steps:

determining whether the degree of opening of the electronic expansion valve of the outdoor unit whose average exhaust temperature is higher than the average exhaust temperature of the outdoor unit system is greater than the maximum degree of opening; and when the degree of opening of the electronic expansion valve is less than the maximum degree of opening, controlling the electronic expansion valve to increase the degree of opening on the basis of the current degree of opening.

In this embodiment, the degree of opening of the electronic expansion valve is controlled by determining the relationship between the average exhaust temperature of the outdoor unit and the average exhaust temperature of the outdoor unit system.

In one embodiment, the average exhaust temperature of each outdoor unit and the average exhaust temperature of the outdoor unit system are determined first. When the average exhaust temperature of the outdoor unit is greater than the average exhaust temperature of the outdoor unit system, whether the electronic expansion valve of the outdoor unit reaches its maximum degree of opening is detected. When it is detected that the electronic expansion valve has not reached the maximum degree of opening, the electronic expansion valve is controlled to increase the degree of opening on the basis of the current degree of opening, so as to increase the refrigerant volume of the compressor of the outdoor unit and to reduce its exhaust temperature.

It can be understood that, the number of outdoor units in this embodiment may be two, three or more than three, which will not be limited here.

In this embodiment, by comparing the average exhaust temperature of the outdoor unit and the average exhaust temperature of the outdoor unit system, and controlling the degree of opening of the electronic expansion valve according to the comparing result, the even distribution of refrigerant in the whole multi-split air conditioner system can be effectively realized.

Further, in other embodiments, the program for controlling the multi-split air conditioner, when executed by the processor, implements the following method steps:

determining whether the degree of opening of the electronic expansion valve of the outdoor unit whose average exhaust temperature is lower than the average exhaust temperature of the outdoor unit system is greater than the minimum degree of opening;

when the degree of opening of the electronic expansion valve is greater than the minimum degree of opening, controlling the electronic expansion valve to reduce the degree of opening on the basis of the current degree of opening.

In this embodiment, the degree of opening of the electronic expansion valve is controlled by determining the relationship between the average exhaust temperature of the outdoor unit and the average exhaust temperature of the outdoor unit system.

In one embodiment, the average exhaust temperature of each outdoor unit and the size of the average exhaust temperature of the outdoor unit system are determined first. When the average exhaust temperature of the outdoor unit is greater than the average exhaust temperature of the outdoor unit system, whether the electronic expansion valve of the outdoor unit reaches its maximum degree of opening is detected. When it is detected that the electronic expansion valve has not reached the maximum degree of opening, the electronic expansion valve is controlled to increase the degree of opening on the basis of the current degree of opening, so as to increase the refrigerant volume of the compressor of the outdoor unit and to reduce its exhaust temperature.

It can be understood that, the number of outdoor units in this embodiment may be two, three or more than three, which will not be limited here In this embodiment, by comparing the average exhaust temperature of the outdoor unit and the average exhaust temperature of the outdoor unit system, and controlling the degree of opening of the electronic expansion valve according to the comparing result, the distribution of refrigerant in the whole multi-split air conditioner system can be effectively realized.

Further, in other embodiments, the program for controlling the multi-split air conditioner, when executed by the processor, implements the following method steps:

obtaining the exhaust temperature of each outdoor unit;

obtaining a lowest exhaust temperature in the exhaust temperatures of all the outdoor units by comparing the exhaust temperatures obtained;

detecting whether the degree of superheat of the outdoor unit corresponding to the lowest exhaust temperature meets the target requirement.

In this embodiment, the exhaust temperature of each outdoor unit is obtained, the lowest exhaust temperature of all exhaust temperatures is obtained by comparing the obtained exhaust temperatures, and furthermore, whether the degree of superheat of the outdoor unit corresponding to the lowest exhaust temperature meets the target requirement is determined. When the degree of superheat of the outdoor unit corresponding to the lowest exhaust temperature meets the target requirement, it indicates that the degrees of superheat of other outdoor units whose exhaust temperatures are higher than the lowest exhaust temperature can also meet the target requirement. Thus, it is only necessary to determine whether the degree of superheat of the outdoor unit corresponding to the lowest exhaust temperature meets the target requirement.

It should be noted that, the above obtained exhaust temperature of each outdoor unit refers to the average of the exhaust temperatures of all the compressors of each outdoor unit, and the lowest exhaust temperature is obtained by comparing the exhaust temperatures of all the outdoor units.

In this embodiment, the lowest exhaust temperature of the exhaust temperatures of all the outdoor units is obtained, and whether the degree of superheat of the outdoor unit corresponding to the lowest exhaust temperature meets the target requirement is determined, and when the degree of superheat of the outdoor unit corresponding to the lowest exhaust temperature meets the target requirement, it can be determined that the degrees of superheat of other outdoor units can also meet the target requirement. In this way, there is no need to determine the degrees of superheat of all the outdoor units, improving the operating efficiency.

Further, in other embodiments, the program for controlling the multi-split air conditioner, when executed by the processor, implements the following method steps:

obtaining the absolute value of the difference between the average exhaust temperature of each outdoor unit and the average exhaust temperature of the outdoor unit system according to the average exhaust temperature of each outdoor unit and the average exhaust temperature of the outdoor unit system; and determining whether the absolute value reaches the preset value.

In this embodiment, whether the absolute value of the difference between the average exhaust temperature of each outdoor unit and the average exhaust temperature of the outdoor unit system reaches the preset value is determined before comparing the average exhaust temperature of each outdoor unit and the average exhaust temperature of the outdoor unit system. When the preset value is not reached, it indicates that the average exhaust temperature of the outdoor unit differs little from the average exhaust temperature of the outdoor unit system, and the difference between the two is within the range of fluctuations. When the absolute value of the difference between the average exhaust temperature of the outdoor unit and the average exhaust temperature of the outdoor unit system reaches the preset value, the comparing of the average exhaust temperature of the outdoor unit and the average exhaust temperature of the outdoor unit system is performed.

The preset range may be set according to the requirement of the system, and the preset range may allow that the average exhaust temperature of each outdoor unit can have a fluctuating value between the upper and lower limits of the average exhaust temperature of outdoor unit system, so as to ensure the reliability of system control.

Further, embodiments of the present disclosure further propose a computer readable storage medium. The computer readable storage medium is stored thereon with a program for controlling the multi-split air conditioner. The program for controlling the multi-split air conditioner, when executed by a processor, implement the steps of the method described in the above embodiments.

Figure 1A:
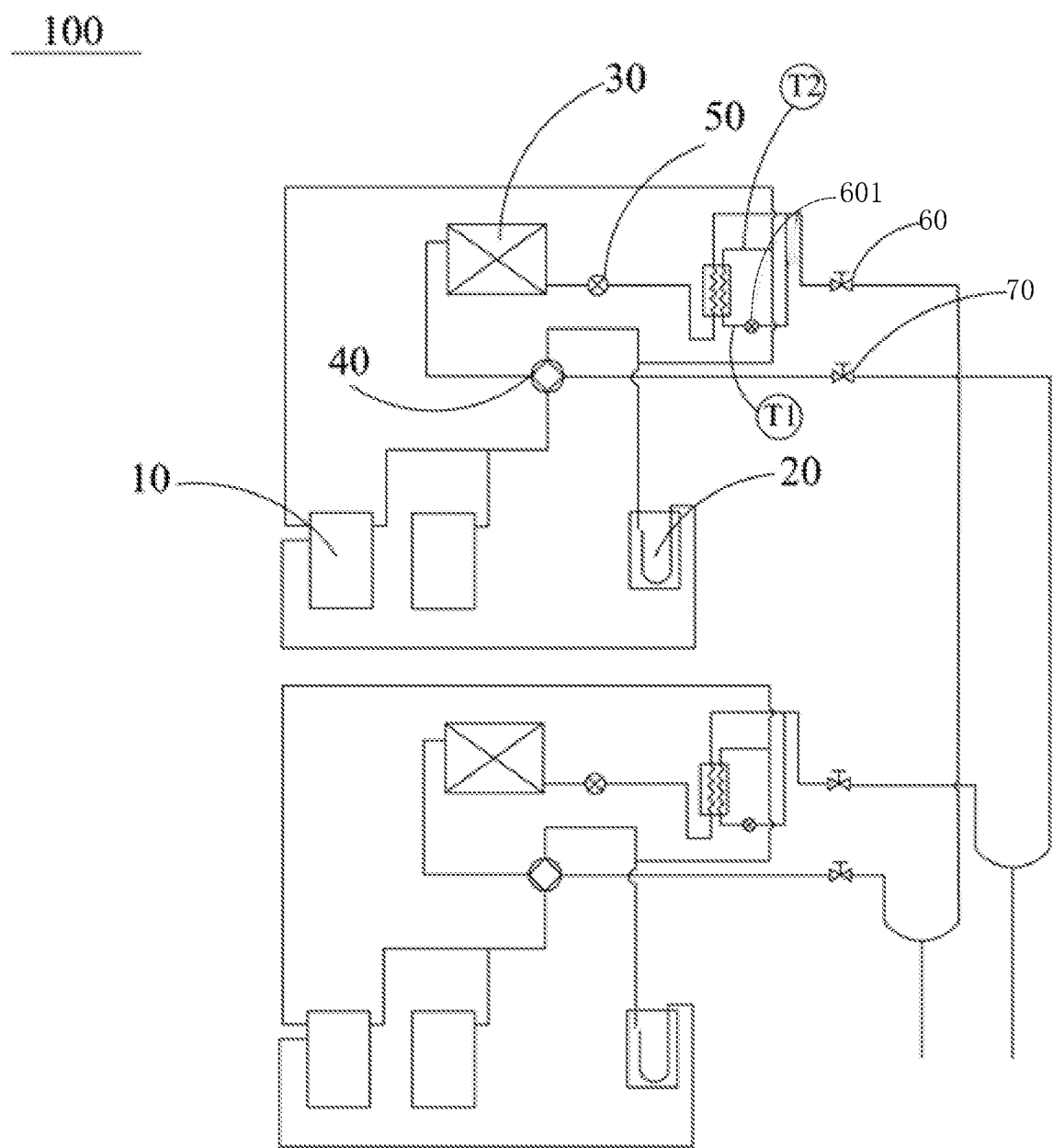
FIG. 1A is a schematic diagram of a multi-split air conditioner system according to another embodiment of the present disclosure.

According to another embodiment of the present disclosure, the present disclosure provides another method for controlling the multi-split air conditioner. The method is applied to the multi-split air conditioner system. The multi-split air conditioner system includes at least two outdoor units connected in parallel and at least two indoor units connected in parallel, in which the indoor unit and the outdoor unit are connected in series correspondingly. The pipeline structure of the outdoor unit includes a gas-liquid separator 20, a compressor unit, an outdoor heat exchanger 30, a reversing valve 40, an electronic expansion valve 50, a jet electronic expansion valve 601, a high-pressure globe valve 60 and a low-pressure globe valve 70; the reversing valve 40 is a four-way valve. Referring to FIG. 1A, the connection mode of the outdoor unit pipeline is a conventional connection mode in the art, which will not be elaborated here. In this embodiment, the multi-split air conditioner in the embodiment is a system with EVI, and the compressor in the compressor unit is a compressor with EVI. In the system with EVI, the electronic expansion valve includes a jet electronic expansion valve 601 and a conventional electronic expansion valve 50. The controlling of the degree of opening of the electronic expansion valve in the embodiment refers to the controlling of the degree of opening of the jet electronic expansion valve 601.

Figure 2A:
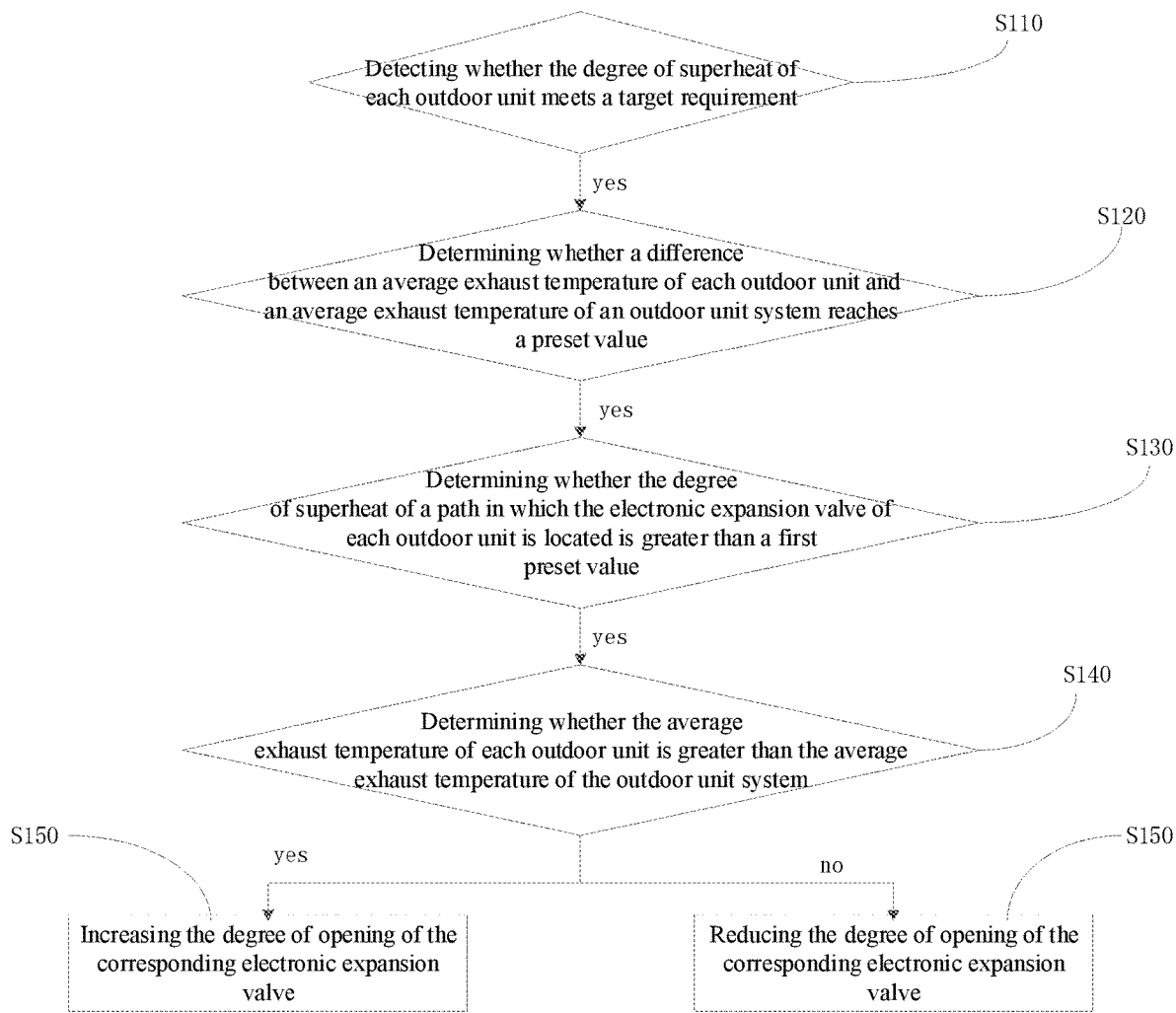
FIG. 2A is a flow chart of a first embodiment of a method for controlling a multi-split air conditioner according to another embodiment of the present disclosure.

In a first embodiment, referring to FIG. 2A, the method for controlling the multi-split air conditioner includes following steps.

At step S110, whether a degree of superheat of each outdoor unit meets a target requirement is detected.

In this embodiment, whether the degree of superheat of each outdoor unit meets the target requirement is detected first to determine whether the compressor of each outdoor unit is in a normal working state. When the degree of superheat of the outdoor unit exceeds the target value, it may be due to different resistance of the pipelines through which the refrigerant flows or the different indoor loads, which results in an excessively high degree of superheat of the outdoor unit and leaves the compressor of the outdoor unit in an overloaded state. At this time, the flux of the refrigerant should be adjusted to make the degree of superheat of the outdoor unit reach the target value. Secondly, when the degree of superheat of the outdoor unit is less than the target value, it may be due to the refrigerant flowing into the compressor in a gas-liquid two-phase state, causing damage to the compressor; and therefore, it is necessary to reduce the refrigerant flux of the compressor first, so as to avoid the refrigerant flowing into the compressor in the gas-liquid two-phase state and causing damage to the whole system. Only when the degree of superheat of each outdoor unit meets the target requirement, subsequent operation can be continued, otherwise it is necessary to adjust the degree of superheat of the compressor to meet the target requirement.

At step S120, when the degree of superheat of each outdoor unit meets the target requirement, a first determination as to whether a difference between an average exhaust temperature of each outdoor unit and an average exhaust temperature of an outdoor unit system reaches a preset value is performed.

When the degree of superheat of each outdoor unit meets the target requirement, whether the difference between the average exhaust temperature of each outdoor unit and the average exhaust temperature of the outdoor unit system reaches the preset value is further determined. The preset value may be set based on demands. When the difference between the average exhaust temperature of each outdoor unit and the average exhaust temperature of the outdoor unit system is below the preset value, it indicates that the average exhaust temperature of each outdoor unit at this time differs little from the average exhaust temperature of the outdoor unit system, which belongs to the acceptable fluctuation range, and then there is no need to adjust the operation of the outdoor unit. However, when the difference between the average exhaust temperature of each outdoor unit and the average exhaust temperature of the outdoor unit system exceeds the preset value, it indicates that the average exhaust temperature of each outdoor unit deviates heavily from the average exhaust temperature of the outdoor unit system, which may affect the normal operation of the outdoor unit, and therefore, it is necessary to take measures to adjust the exhaust temperature to make it approximate to the average exhaust temperature of the outdoor unit system.

At step S130, when the difference between the average exhaust temperature of each outdoor unit and the average exhaust temperature of the outdoor unit system reaches the preset value, a second determination as to whether the degree of superheat of the path in which the electronic expansion valve of each outdoor unit is located is greater than a first preset value is performed.

On the basis of the above first determination of the average exhaust temperature of the outdoor unit and the average exhaust temperature of the outdoor unit system, whether the degree of superheat of the path in which the electronic expansion valve of the outdoor unit is located is greater than the first preset value is further determined, in which the electronic expansion valve here refers to the jet electronic expansion valve in the system. The first preset value defines that the jet electronic expansion valve is in an operable state, that is, the degree of opening of the ejector electronic expansion valve can be adjusted only when the degree of superheat corresponding to the jet electronic expansion valve is larger than the first preset value.

It should be noted that, the degree of superheat of the jet electronic expansion valve is defined as follows. Referring to FIG. 1A, the degree of superheat of the path in which the jet electronic expansion valve of the outdoor unit is located is calculated through the temperature T1 and T2 and pressure detected at the jet electronic expansion valve.

At step S140, when the degree of superheat of the path in which the electronic expansion valve of each outdoor unit is located is greater than the first preset value, a third determination as to whether the average exhaust temperature of each outdoor unit is greater than the average exhaust temperature of the outdoor unit system is performed.

Further, when the difference between the average exhaust temperature of each outdoor unit and the average exhaust temperature of the outdoor unit system reaches the preset value, whether the average exhaust temperature of each outdoor unit is greater than the average exhaust temperature of the outdoor unit system is determined. It should be noted that, determining whether the average exhaust temperature of each outdoor unit is greater than the average exhaust temperature of the outdoor unit system means determining the average exhaust temperature of each outdoor unit and the average exhaust temperature of the outdoor unit system separately. Each determination of the outdoor unit is independent. Moreover, as long as the difference between the average exhaust temperature of each outdoor unit and the average exhaust temperature of the outdoor unit system reaches the preset value, it is determined that the outdoor unit need to be adjusted to make the average exhaust temperature of the outdoor unit approximate to the average exhaust temperature of the outdoor unit system.

The average exhaust temperature of each outdoor unit is the average of the exhaust temperatures of the compressors in each outdoor unit. For example, when there are three outdoor units, the average exhaust temperatures of the three outdoor units are set as TP1, TP2 and TP3, each outdoor unit includes two compressors, and the exhaust temperatures of the compressors are TP1C1, TP1C2, TP2C1, TP2C2, TP3C1 and TP3C2 respectively, then the average exhaust temperatures of the three outdoor units are $TP1=(TP1C1+TP1C2)/2$, $TP2=(TP2C1+TP2C2)/2$, $TP3=(TP3C1+TP3C2)/2$. The average exhaust temperature of the outdoor unit system is the average of the average exhaust temperatures of the three outdoor units. Let the average exhaust temperature of the outdoor unit system is set as TP, then $TP=(TP1+TP2+TP3)/3$.

At step S150, when the result of the third determination is "yes", the degree of opening of the corresponding electronic expansion valve is increased; and when the result of the third determination is "no", the degree of opening of the corresponding electronic expansion valve is reduced.

The processing with respect to the result of the above determination is as follows. When the result of the third determination is "yes", i.e. when the average exhaust temperature of the outdoor unit is greater than the average exhaust temperature of the outdoor unit system, it indicates that the average exhaust temperature of the outdoor unit is higher than the exhaust temperature of the whole outdoor unit system, which indicates that the amount of refrigerant of the outdoor unit is relatively small, and in this case, the flux of the refrigerant is needed to be increased. In such scenario, whether the degree of superheat of the path in which the jet electronic expansion valve is located reaches the first preset value is further determined. When the degree of superheat of the path in which the jet electronic expansion valve is located has not reached the first preset value, since the refrigerant flowing through the jet electronic expansion valve here is directly sprayed back to the compressor, opening the jet electronic expansion valve at this moment may cause the refrigerant to flow into the compressor in a liquid form, which will generate liquid deposition in the compressor, thereby causing damage to the compressor. Therefore, before opening the jet electronic expansion valve, it is necessary to determine whether the path in which the jet electronic expansion valve is located reaches the first preset value. When the jet electronic expansion valve reaches the first preset value, the jet electronic expansion valve is controlled to increase the degree of opening on the basis of the current degree of opening, so as to increase the refrigerant flowing from here into the compressor of the outdoor unit, reducing the exhaust temperature of the compressor of the outdoor unit.

Further, when the result of the third determination is "no", i.e. when the average exhaust temperature of the outdoor unit is lower than the average exhaust temperature of the outdoor unit system, it indicates that the exhaust air temperature of the compressor is too low, that is, the amount of refrigerant in the compressor of the outdoor unit is relatively large, and thus it is necessary to control the valve to reduce the refrigerant flow of the compressor of the outdoor unit. Similarly, before controlling the jet electronic expansion valve, whether the degree of superheat of the path in which the jet electronic expansion valve is located reaches the first preset value is determined. When the degree of superheat of the path in which the jet electronic expansion valve is located reaches the first preset value, the degree of opening of the jet electronic expansion valve is reduced on the basis of the current degree of opening of the jet electronic expansion valve, further reducing the refrigerant flowing into the compressor of the outdoor unit.

It should be noted that, when the degree of superheat of the path in which the jet electronic expansion valve is located has not reached the first preset value, the refrigerant flow of the compressor of the outdoor unit can be controlled by controlling the degree of opening of the conventional electronic expansion valve on the main path, or the exhaust temperature of the compressor can be balanced by controlling the frequency of the compressor.

It should be further noted that, in this embodiment, the setting of the first preset value for the degree of superheat of the path in which the jet electronic expansion valve is located is variable with ambient temperature, and the setting standard of the first preset value is generally greater than 5° C., which can be set based on demands.

Further, when the degree of superheat of the path in which the jet electronic expansion valve is located has not reached the first preset value, whether the degree of superheat of the path in which the jet electronic expansion valve is located is less than a second preset value is further determined, where the second preset value is a positive number associated with the first preset value, which is smaller than the first preset value. When the degree of superheat of the path in which the jet electronic expansion valve is located is less than the second preset value, the current degree of opening of the jet electronic expansion valve remains unchanged.

In this embodiment, whether the degree of superheat of each outdoor unit meets the target requirement is detected; when the degree of superheat of each outdoor unit meets the target requirement, the first determination as to whether the difference between the average exhaust temperature of each outdoor unit and the average exhaust temperature of the outdoor unit system reaches the preset value is performed; when the difference between the average exhaust temperature of each outdoor unit and the average exhaust temperature of the outdoor unit system reaches the preset value, the second determination as to whether the degree of superheat of the path in which the electronic expansion valve of each outdoor unit is located is greater than the first preset value is performed; when the degree of superheat of the path in which the electronic expansion valve of each outdoor unit is located is greater than the first preset value, the third determination as to whether the average exhaust temperature of each outdoor unit is greater than the average exhaust temperature of the outdoor unit system is performed; if the result of the third determination is "yes", the degree of opening of the corresponding electronic expansion valve is increased; and if the result of the third determination is "no", the degree of opening of the corresponding electronic expansion valve is reduced. With the method described in this embodiment, the problem of the uneven distribution of the refrigerant in the multi-split air conditioner system is solved, and especially in the multi-split air conditioner system with EVI, the exhaust temperature of the system is controlled effectively by controlling the degree of opening of the jet electronic expansion valve.

Furthermore, referring to FIG. 7, based on the first embodiment of the method for controlling the multi-split air conditioner according to the present disclosure, in the second embodiment of the method for controlling the multi-split air conditioner according to the present disclosure, step S110 includes followings.

At step S11, the exhaust temperature of each outdoor unit is obtained.

At step S12, a lowest exhaust temperature in the exhaust temperatures of all the outdoor units is obtained by comparing the exhaust temperatures obtained.

At step S13, whether the degree of superheat of the outdoor unit corresponding to the lowest exhaust temperature meets the target requirement is detected.

In this embodiment, the exhaust temperature of each outdoor unit is obtained, the lowest exhaust temperature of all exhaust temperatures is obtained according to the comparison of the obtained exhaust temperatures, and furthermore, whether the degree of superheat of the outdoor unit corresponding to the lowest exhaust temperature meets the target requirement is determined. When the degree of superheat of the outdoor unit corresponding to the lowest exhaust temperature meets the target requirement, it indicates that the degrees of superheat of other outdoor units whose exhaust temperatures are higher than the lowest exhaust temperature can also meet the target requirement. Thus, it is only necessary to determine whether the degree of superheat of the outdoor unit corresponding to the lowest exhaust temperature meets the target requirement.

It should be noted that, the above obtained exhaust temperature of each outdoor unit refers to the average of the exhaust temperatures of all the compressors of each outdoor unit, and the lowest exhaust temperature is obtained by comparing the exhaust temperatures of all the outdoor units.

In this embodiment, the lowest exhaust temperature of the exhaust temperatures of all the outdoor units is obtained, and whether the degree of superheat of the outdoor unit corresponding to the lowest exhaust temperature meets the target requirement is determined, and when the degree of superheat of the outdoor unit corresponding to the lowest exhaust temperature meets the target requirement, it can be determined that the degrees of superheat of other outdoor units can also meet the target requirement. In this way, there is no need to determine the degrees of superheat of all the outdoor units, improving the operating efficiency.

Figure 4A:
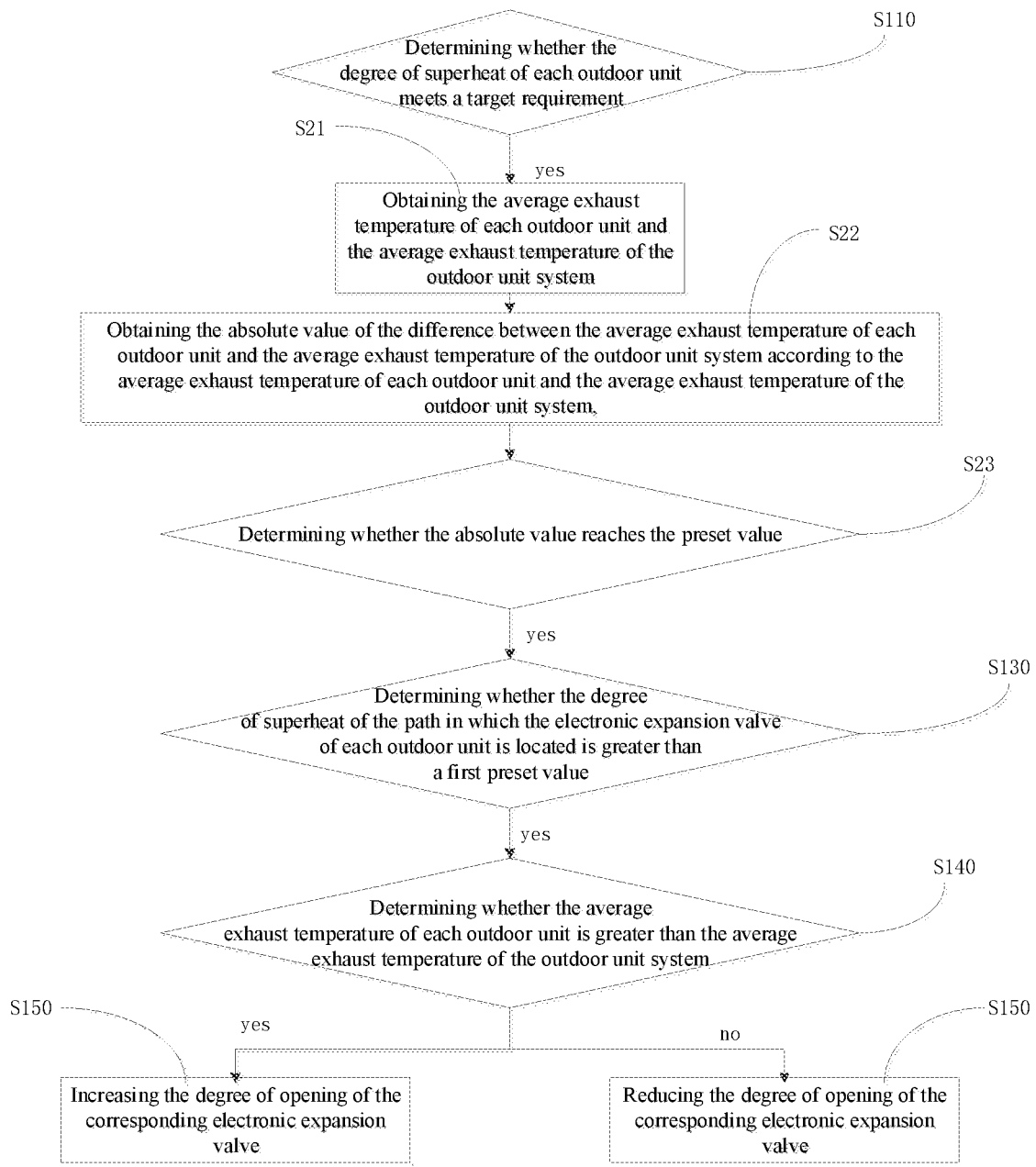
FIG. 4A is a flow chart of a third embodiment of a method for controlling a multi-split air conditioner according to another embodiment of the present disclosure.

Furthermore, referring to FIG. 4A, based on the second embodiment of the method for controlling the multi-split air conditioner according to the present disclosure, in the third embodiment of the method for controlling the multi-split air conditioner according to the present disclosure, step S120 includes followings.

At step S21, the average exhaust temperature of each outdoor unit and the average exhaust temperature of the outdoor unit system are obtained.

At step S22, the absolute value of the difference between the average exhaust temperature of each outdoor unit and the average exhaust temperature of the outdoor unit system is obtained according to the average exhaust temperature of each outdoor unit and the average exhaust temperature of the outdoor unit system.

At step S23, whether the absolute value reaches the preset value is determined.

In this embodiment, whether the absolute value of the difference between the average exhaust temperature of each outdoor unit and the average exhaust temperature of the outdoor unit system reaches the preset value is determined before comparing the average exhaust temperature of each outdoor unit and the average exhaust temperature of the outdoor unit system. When the preset value is not reached, it indicates that the average exhaust temperature of the outdoor unit is not much different from the average exhaust temperature of the outdoor unit system, and the difference between the two is within the range of fluctuations. When the absolute value of the difference between the average exhaust temperature of the outdoor unit and the average exhaust temperature of the outdoor unit system reaches the preset value, the comparing of the average exhaust temperature of the outdoor unit and the average exhaust temperature of the outdoor unit system is performed.

The preset range may be set according to the requirement of the system, and the preset range may allow that the average exhaust temperature of each outdoor unit can have a fluctuating value between the upper and lower limits of the average exhaust temperature of outdoor unit system, so as to ensure the reliability of system control.

Figure 5A:
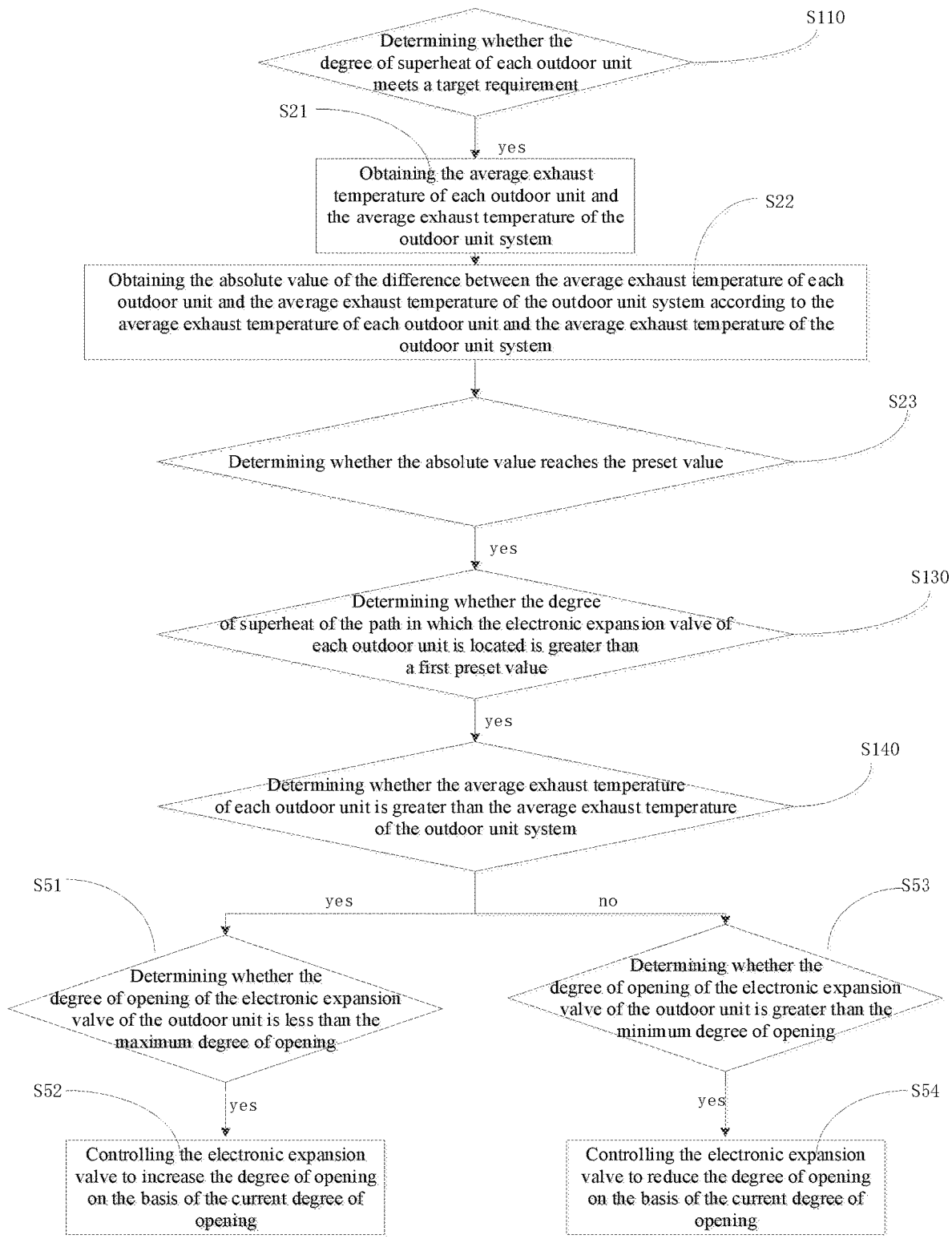
FIG. 5A is a flow chart of a fourth embodiment of a method for controlling a multi-split air conditioner according to another embodiment of the present disclosure.

Furthermore, referring to FIG. 5A, in the fourth embodiment of the method for controlling the multi-split air conditioner according to the present disclosure, after step S150, the method further includes followings.

At step S51, if the result of the third determination is "yes", whether the degree of opening of the electronic expansion valve of the outdoor unit is less than the maximum degree of opening is determined.

At step S52, when the degree of opening of the electronic expansion valve of the outdoor unit is less than the maximum degree of opening, the electronic expansion valve is controlled to increase the degree of opening on the basis of the current degree of opening.

In this embodiment, when the average exhaust temperature of the compressor of the outdoor unit is higher than the average exhaust temperature of the outdoor unit system, and the degree of superheat of the path in which the electronic expansion valve of each outdoor unit is located is greater than the first preset value, it is further determined whether the current degree of opening of the jet electronic expansion valve has reached the maximum degree of opening it can reach. When the current degree of opening of the jet electronic expansion valve has reached the maximum degree of opening it can reach, it indicates that the jet electronic expansion valve cannot increase the degree of opening any more. Therefore, only when the current degree of opening of the jet electronic expansion valve has not reached the maximum degree of opening, the jet electronic expansion valve can be controlled to continue to increase the degree of opening.

Therefore, when it is detected that the jet electronic expansion valve has not reached the maximum degree of opening, the jet electronic expansion valve is controlled to increase the degree of opening on the basis of the current degree of opening, so as to increase the refrigerant volume of the compressor of the outdoor unit to reduce its exhaust temperature.

In this embodiment, by determining whether the degree of opening of the jet electronic expansion valve reaches the maximum degree of opening, whether the jet electronic expansion valve can continue to open is further determined. In this way, the accuracy of controlling the jet electronic expansion valve is improved, and the jet electronic expansion valve and the whole system can be protected.

Furthermore, referring to FIG. 5A, in another embodiment, after step S150, the method further includes followings.

At step S53, when the result of the third determination is "no", whether the degree of opening of the electronic expansion valve of the outdoor unit is greater than the minimum degree of opening is determined.

At step S54, when the degree of opening of the electronic expansion valve of the outdoor unit is greater than the minimum degree of opening, the electronic expansion valve is controlled to reduce the degree of opening on the basis of the current degree of opening.

In this embodiment, when the average exhaust temperature of the compressor of the outdoor unit is lower than the average exhaust temperature of the outdoor unit system, and the degree of superheat of the path in which the electronic expansion valve of each outdoor unit is located is greater than the first preset value, it is further determined whether the current degree of opening of the jet electronic expansion valve has reached the minimum degree of opening it can reach. When the current degree of opening of the jet electronic expansion valve has reached the minimum degree of opening it can reach, it indicates that the jet electronic expansion valve cannot reduce the degree of opening any more. Therefore, only when the current degree of opening of the jet electronic expansion valve has not reached the minimum degree of opening, the jet electronic expansion valve can be controlled continuously to reduce the degree of opening.

Therefore, when it is detected that the jet electronic expansion valve has not reached the maximum degree of opening, the jet electronic expansion valve is controlled to increase the degree of opening on the basis of the current degree of opening, so as to increase the refrigerant flow of the compressor of the outdoor unit to reduce its exhaust temperature.

In this embodiment, by determining whether the degree of opening of the jet electronic expansion valve reaches the minimum degree of opening, whether the jet electronic expansion valve can continue to close is further determined. In this way, the accuracy of controlling the jet electronic expansion valve is improved, and the jet electronic expansion valve and the whole system can be protected.

Furthermore, referring to FIG. 9, in another embodiment, the method further includes followings.

At step S00, an exhaust temperature of the compressor of each outdoor unit is obtained.

At step S01, whether the exhaust temperature of the compressor of each outdoor unit is within a preset range is determined.

At step S02, when the exhaust temperature of the compressor of the outdoor unit exceeds the preset range, a fault signal is released.

In this embodiment, the exhaust temperature of the compressor of each outdoor unit is obtained, and whether the exhaust temperature of the compressor of each outdoor unit is within the preset range is further determined. when the exhaust temperature of the compressor exceeds the preset range, a fault signal is released. This preset range is the exhaust temperature range of the compressor under a normal working condition, which can be set according to the actual situation of the system.

By detecting whether the exhaust temperature of each compressor is within a normal preset range, a timely warning can be released in case of a compressor failure, preventing further damage to the compressor when it continues working in the fault state.

The present disclosure further provides another multi-split air conditioner system 100. Referring to FIG. 1A and FIG. 10, the multi-split air conditioner system includes at least two outdoor units, each outdoor unit includes at least one compressor 10, and the at least two outdoor units constitute an outdoor unit system. The outdoor unit further includes a reversing valve 40, a gas-liquid separator 20, an outdoor heat exchanger 30, an electronic expansion valve, a high-pressure globe valve 60 and a low-pressure globe valve 70 connected on an outdoor unit pipeline. The reversing valve 40 is a four-way valve. Referring to FIG. 1A, the connection mode of the outdoor unit pipeline is a conventional connection mode in the art, which will not be elaborated here. In this embodiment, the multi-split air conditioner is a system with EVI, and the compressor in the compressor unit is a compressor with EVI. In the system with EVI, the electronic expansion valve includes a jet electronic expansion valve 601 and a conventional electronic expansion valve 50. The multi-split air conditioner system 100 further includes: a memory 101, a processor 102 and a program for controlling a multi-split air conditioner stored on the memory 101 and capable of running on the processor 102. When executed by the processor 102, the program for controlling the multi-split air conditioner implements the steps of the method described below:

detecting whether the degree of superheat of each outdoor unit meets a target requirement;

when the degree of superheat of each outdoor unit meets the target requirement, performing a first determination as to whether a difference between an average exhaust temperature of each outdoor unit and an average exhaust temperature of an outdoor unit system reaches a preset value;

when the difference between the average exhaust temperature of each outdoor unit and the average exhaust temperature of the outdoor unit system reaches the preset value, performing a second determination as to whether the degree of superheat of the path in which the electronic expansion valve of each outdoor unit is located is greater than a first preset value;

when the degree of superheat of the path in which the electronic expansion valve of each outdoor unit is located is greater than the first preset value, performing a third determination as to whether the average exhaust temperature of each outdoor unit is greater than the average exhaust temperature of the outdoor unit system;

when the result of the third determination is "yes", increasing the degree of opening of the corresponding electronic expansion valve; and when the result of the third determination is "no", reducing the degree of opening of the corresponding electronic expansion valve.

In this embodiment, whether the degree of superheat of each outdoor unit meets the target requirement is detected first to determine whether the compressor of each outdoor unit is in a normal working state. When the degree of superheat of the outdoor unit exceeds the target value, it may be due to different resistance of the pipelines through which the refrigerant flows or the different indoor loads, which results in an excessively high degree of superheat of the outdoor unit and leaves the compressor of the outdoor unit in an overloaded state. At this time, the flux of the refrigerant should be adjusted to make the degree of superheat of the outdoor unit reach the target value. Secondly, when the degree of superheat of the outdoor unit is less than the target value, it may be due to the refrigerant flowing into the compressor in a gas-liquid two-phase state, causing damage to the compressor; and therefore, it is necessary to reduce the refrigerant flux of the compressor first, so as to avoid the refrigerant flowing into the compressor in the gas-liquid two-phase state and causing damage to the whole system. Only when the degree of superheat of each outdoor unit meets the target requirement, subsequent operation can be continued, otherwise it is necessary to adjust the degree of superheat of the compressor to meet the target requirement.

When the degree of superheat of each outdoor unit meets the target requirement, whether the difference between the average exhaust temperature of each outdoor unit and the average exhaust temperature of the outdoor unit system reaches the preset value is further determined. The preset value can be set based on demands. When the difference between the average exhaust temperature of each outdoor unit and the average exhaust temperature of the outdoor unit system is below the preset value, it indicates that the average exhaust temperature of each outdoor unit at this time differs little from the average exhaust temperature of the outdoor unit system, which belongs to the acceptable fluctuation range, and then there is no need to adjust the operation of the outdoor unit. However, when the difference between the average exhaust temperature of each outdoor unit and the average exhaust temperature of the outdoor unit system exceeds the preset value, it indicates that the average exhaust temperature of each outdoor unit deviates heavily from the average exhaust temperature of the outdoor unit system, which may affect the normal operation of the outdoor unit, and therefore, it is necessary to take measures to adjust the exhaust temperature to make it approximate to the average exhaust temperature of the outdoor unit system.

On the basis of the above first determination of the average exhaust temperature of the outdoor unit and the average exhaust temperature of the outdoor unit system, whether the degree of superheat of the path in which the electronic expansion valve of the outdoor unit is located is greater than the first preset value is further determined, in which the electronic expansion valve here refers to the jet electronic expansion valve in the system. The first preset value defines that the jet electronic expansion valve is in an operable state, that is, the degree of opening of the jet electronic expansion valve can be adjusted only when the degree of superheat of the jet electronic expansion valve is larger than the first preset value.

It should be noted that, the degree of superheat of the jet electronic expansion valve is defined as follows. Referring to FIG. 1A, the degree of superheat of the path in which the jet electronic expansion valve of the outdoor unit is located is calculated through the temperature T1 and T2 and pressure detected at the jet electronic expansion valve.

Further, when the difference between the average exhaust temperature of each outdoor unit and the average exhaust temperature of the outdoor unit system reaches the preset value, whether the average exhaust temperature of each outdoor unit is greater than the average exhaust temperature of the outdoor unit system is determined. It should be noted that, determining whether the average exhaust temperature of each outdoor unit is greater than the average exhaust temperature of the outdoor unit system means determining the average exhaust temperature of each outdoor unit and outdoor system average exhaust temperature separately. Determination is performed for each outdoor unit independently. Moreover, as long as the difference between the average exhaust temperature of the outdoor unit and the average exhaust temperature of the outdoor unit system reaches the preset value, it is determined that the outdoor unit needs to be adjusted to make the average exhaust temperature of the outdoor unit approximate to the average exhaust temperature of the outdoor unit system.

The average exhaust temperature of each outdoor unit is the average of the exhaust temperatures of the compressors in each outdoor unit. For example, if there are three outdoor units, the average exhaust temperatures of the three outdoor units are set as TP1, TP2 and TP3, each outdoor unit includes two compressors, the exhaust temperatures of the compressors are TP1C1, TP1C2, TP2C1, TP2C2, TP3C1 and TP3C2 respectively, then the average exhaust temperatures of the three outdoor units are TP1=(TP1C1+TP1C2)/2, TP2=(TP2C1+TP2C2)/2, TP3=(TP3C1+TP3C2)/2. The average exhaust temperature of the outdoor unit system is the average of the average exhaust temperatures of the three outdoor units. Let the average exhaust temperature of the outdoor unit system is set as TP, then TP=(TP1+TP2+TP3)/3.

The processing with respect to the result of the above determination is as follows. When the result of the third determination is "yes", i.e. when the average exhaust temperature of the outdoor unit is greater than the average exhaust temperature of the outdoor unit system, it indicates that the average exhaust temperature of the outdoor unit is higher than the exhaust temperature of the whole outdoor unit system, which indicates that the amount of refrigerant of the outdoor unit is relatively small, and thus the flux of the refrigerant is needed to be increased. In such scenario, whether the degree of superheat of the path in which the jet electronic expansion valve is located reaches the first preset value is further determined. When the degree of superheat of the path in which the jet electronic expansion valve is located has not reached the first preset value, since the refrigerant flowing through the jet electronic expansion valve here is directly sprayed back to the compressor, opening the jet electronic expansion valve at this moment may cause the refrigerant to flow into the compressor in a liquid form, which will generate liquid deposition in the compressor, thereby causing damage to the compressor. Therefore, before opening the jet electronic expansion valve, it is necessary to determine whether the degree of superheat of the path in which the jet electronic expansion valve is located reaches the first preset value. When the jet electronic expansion valve reaches the first preset value, the jet electronic expansion valve is controlled to increase the degree of opening on the basis of the current degree of opening, so as to increase the refrigerant flowing into the compressor, reducing the exhaust temperature of the compressor of the outdoor unit.

Further, when the result of the third determination is "no", i.e. when the average exhaust temperature of the outdoor unit is lower than the average exhaust temperature of the outdoor unit system, it indicates that the exhaust temperature of the compressor of the outdoor unit is too low, that is, the amount of refrigerant in the compressor of the outdoor unit is relatively large, and thus it is necessary to control the valve to reduce the refrigerant flow of the compressor. Similarly, before controlling the jet electronic expansion valve, whether the degree of superheat of the path in which the jet electronic expansion valve is located reaches the first preset value is determined. When the degree of superheat of the path in which the jet electronic expansion valve is located reaches the first preset value, the degree of opening of the jet electronic expansion valve is reduced on the basis of the current degree of opening of the jet electronic expansion valve, thereby reducing the refrigerant flowing into the compressor of the outdoor unit.

It should be noted that, when the degree of superheat of the path in which the jet electronic expansion valve is located has not reached the first preset value, the refrigerant flow of the compressor of the outdoor unit can be controlled by controlling the degree of opening of the conventional electronic expansion valve on the main path, or the exhaust temperature of the compressor may be balanced by controlling the frequency of the compressor.

It should be further noted that, in this embodiment, the setting of the first preset value for the degree of superheat of the path in which the jet electronic expansion valve is located is variable with ambient temperature, and the setting standard of the first preset value is generally greater than 5° C., which can be set based on demands.

Furthermore, when the degree of superheat of the path in which the jet electronic expansion valve is located has not reached the first preset value, whether the degree of superheat of the path in which the jet electronic expansion valve is located is less than a second preset value is determined, where the second preset value is a positive number associated with the first preset value, which is smaller than the first preset value. When the degree of superheat of the path in which the jet electronic expansion valve is located is less than the second preset value, the current degree of opening of the jet electronic expansion valve remains unchanged.

In this embodiment, whether the degree of superheat of each outdoor unit meets the target requirement is detected; when the degree of superheat of each outdoor unit meets the target requirement, the first determination as to whether the difference between the average exhaust temperature of each outdoor unit and the average exhaust temperature of the outdoor unit system reaches the preset value is performed; when the difference between the average exhaust temperature of each outdoor unit and the average exhaust temperature of the outdoor unit system reaches the preset value, the second determination as to whether the degree of superheat of the path in which the electronic expansion valve of each outdoor unit is located is greater than the first preset value is performed; when the degree of superheat of the path in which the electronic expansion valve of each outdoor unit is located is greater than the first preset value, the third determination as to whether the average exhaust temperature of each outdoor unit is greater than the average exhaust temperature of the outdoor unit system is performed; when the result of the third determination is "yes", the degree of opening of the corresponding electronic expansion valve is increased; and when the result of the third determination is "no", the degree of opening of the corresponding electronic expansion valve is reduced. With the method described in the embodiment, the problem of the uneven distribution of the refrigerant in the multi-split air conditioner system is avoided, and especially in a multi-split air conditioner system with EVI (enhanced vapor injection), the exhaust temperature of the system is controlled effectively by controlling the degree of opening of the jet electronic expansion valve.

Furthermore, in an embodiment, when executed by the processor 102, the program for controlling the multi-split air conditioner implements the following method steps:

obtaining the exhaust temperature of each outdoor unit;

obtaining a lowest exhaust temperature in the exhaust temperatures of all the outdoor units by comparing the exhaust temperatures obtained; and detecting whether the degree of superheat of the outdoor unit corresponding to the lowest exhaust temperature meets the target requirement.

In the embodiment, the exhaust temperature of each outdoor unit is obtained, the lowest exhaust temperature of all exhaust temperatures is obtained according to the comparison of the obtained exhaust temperatures, and furthermore, whether the degree of superheat of the outdoor unit corresponding to the lowest exhaust temperature meets the target requirement is determined. When the degree of superheat of the outdoor unit corresponding to the lowest exhaust temperature meets the target requirement, it indicates that the degrees of superheat of other outdoor units whose exhaust temperatures are higher than the lowest exhaust temperature can also meet the target requirement. Thus, it is only necessary to determine whether the degree of superheat of the outdoor unit corresponding to the lowest exhaust temperature meets the target requirement.

It should be noted that, the above obtained exhaust temperature of each outdoor unit refers to the average of the exhaust temperatures of all the compressors of each outdoor unit, and the lowest exhaust temperature is obtained by comparing the exhaust temperatures of all the outdoor units.

In the embodiment, the lowest exhaust temperature of the exhaust temperatures of all the outdoor units is obtained, and whether the degree of superheat of the outdoor unit corresponding to the lowest exhaust temperature meets the target requirement is determined, and when the degree of superheat of the outdoor unit corresponding to the lowest exhaust temperature meets the target requirement, it can be determined that the degrees of superheat of other outdoor units can also meet the target requirement. In this way, there is no need to determine the degrees of superheat of all the outdoor units, improving the operating efficiency.

Furthermore, in an embodiment, when executed by the processor 102, the program for controlling the multi-split air conditioner implements the following method steps:

obtaining the average exhaust temperature of each outdoor unit and the average exhaust temperature of the outdoor unit system;

obtaining the absolute value of the difference between the average exhaust temperature of each outdoor unit and the average exhaust temperature of the outdoor unit system according to the average exhaust temperature of each outdoor unit and the average exhaust temperature of the outdoor unit system; and determining whether the absolute value reaches the preset value.

In the embodiment, whether the absolute value of the difference between the average exhaust temperature of each outdoor unit and the average exhaust temperature of the outdoor unit system reaches the preset value is determined before comparing the average exhaust temperature of each outdoor unit and the average exhaust temperature of the outdoor unit system. When the preset value is not reached, it indicates that the average exhaust temperature of the outdoor unit is not much different from the average exhaust temperature of the outdoor unit system, and the difference between the two is within the range of fluctuations. When the absolute value of the difference between the average exhaust temperature of the outdoor unit and the average exhaust temperature of the outdoor unit system reaches the preset value, comparing the average exhaust temperature of the outdoor unit and the average exhaust temperature of the outdoor unit system is performed.

The preset range may be set according to the requirement of the system, and the preset range may allow that the average exhaust temperature of each outdoor unit can have a fluctuating value between the upper and lower limits of the average exhaust temperature of outdoor unit system, so as to ensure the reliability of system control.

Furthermore, in another embodiment, when executed by the processor 102, the program for controlling the multi-split air conditioner implements the following method steps:

when the result of the third determination is "yes", determining whether the degree of opening of the electronic expansion valve of the outdoor unit is less than the maximum degree of opening;

when the degree of opening of the electronic expansion valve of the outdoor unit is less than the maximum degree of opening, controlling the electronic expansion valve to increase the degree of opening on the basis of the current degree of opening.

In this embodiment, when the average exhaust temperature of the compressor of the outdoor unit is higher than the average exhaust temperature of the of the outdoor unit system, and the degree of superheat of the path in which the jet electronic expansion valve of each outdoor unit is located is greater than the first preset value, then it is further determined whether the current degree of opening of the jet electronic expansion valve has reached the maximum degree of opening it can reach. When the current degree of opening of the jet electronic expansion valve has reached the maximum degree of opening it can reach, it indicates that the jet electronic expansion valve cannot increase the degree of opening any more. Therefore, only when the current degree of opening of the jet electronic expansion valve has not reached the maximum degree of opening, the jet electronic expansion valve can be controlled continuously to increase the degree of opening.

Therefore, when it is detected that the jet electronic expansion valve has not reached the maximum degree of opening, the jet electronic expansion valve is controlled to increase the degree of opening on the basis of the current degree of opening, so as to increase the refrigerant flow of the compressor of the outdoor unit to reduce its exhaust temperature.

In this embodiment, by determining whether the degree of opening of the jet electronic expansion valve reaches the maximum degree of opening, whether the jet electronic expansion valve can be continued to open is further determined. In this way, the accuracy of controlling the jet electronic expansion valve is improved and the jet electronic expansion valve and the whole system can be protected.

Furthermore, in another embodiment, when executed by the processor 102, the program for controlling the multi-split air conditioner implements the following method steps:

when the result of the third determination is "no", determining whether the degree of opening of the electronic expansion valve of the outdoor unit is greater than the minimum degree of opening is determined;

when the degree of opening of the electronic expansion valve of the outdoor unit is greater than the minimum degree of opening, controlling the electronic expansion valve to reduce the degree of opening on the basis of the current degree of opening.

In this embodiment, when the average exhaust temperature of the compressor of the outdoor unit is lower than the average exhaust temperature of the outdoor unit system, and the degree of superheat of the path in which the jet electronic expansion valve is located is greater than the first preset value, it is further determined whether the current degree of opening of the jet electronic expansion valve has reached the minimum degree of opening it can reach. When the current degree of opening of the jet electronic expansion valve has reached the minimum degree of opening it can reach, it indicates that the jet electronic expansion valve cannot reduce the degree of opening any more. Therefore, only when the current degree of opening of the jet electronic expansion valve has not reached the minimum degree of opening, the jet electronic expansion valve can be controlled continuously to reduce the degree of opening.

Therefore, when it is detected that the jet electronic expansion valve has not reached the maximum degree of opening, the jet electronic expansion valve is controlled to increase the degree of opening on the basis of the current degree of opening, so as to increase the refrigerant flow of the compressor of the outdoor unit to reduce its exhaust temperature.

In this embodiment, by determining whether the degree of opening of the jet electronic expansion valve reaches the minimum degree of opening, whether the jet electronic expansion valve can be continued to close is further determined. In this way, the accuracy of controlling the jet electronic expansion valve is improved and the jet electronic expansion valve and the whole system can be protected.

Furthermore, in another embodiment, when executed by the processor 102, the program for controlling the multi-split air conditioner implements the following method steps:

obtaining an exhaust temperature of the compressor of each outdoor unit;

determining whether the exhaust temperature of the compressor of each outdoor unit is within a preset range;

when the exhaust temperature of the compressor of the outdoor unit exceeds the preset range, releasing a fault signal.

In the embodiment, the exhaust temperature of the compressor of each outdoor unit is obtained, whether the exhaust temperature of each outdoor compressor is within the preset range is further determined. When the exhaust temperature of the compressor exceeds the preset range, the fault signal is released. This preset range is the exhaust temperature range of the compressor under a normal working condition, which can be set according to the actual situation of the system.

By detecting whether the exhaust temperature of each compressor is within a normal preset range, a timely warning can be released in case of a compressor failure, preventing further damage to the compressor when it continues working in the fault state.

Further, embodiments of the present disclosure further propose a computer readable storage medium. The computer readable storage medium is stored thereon with the program for controlling the multi-split air conditioner. The program for controlling the multi-split air conditioner, when executed by the processor 102, implements the steps of the method described in the above embodiments.

What is claimed is:

1. A method for controlling a multi-split air conditioner, wherein the multi-split air conditioner comprises multiple outdoor units, each outdoor unit comprises at least one compressor, the method for controlling a multi-split air conditioner comprises:
    detecting whether a degree of superheat of each outdoor unit meets a target value;
    when the degree of superheat of each outdoor unit meets the target value, determining whether a difference between an average exhaust temperature of each outdoor unit and an average exhaust temperature of the multiple outdoor units reaches a preset value;
    when the difference between the average exhaust temperature of each outdoor unit and the average exhaust temperature of the multiple outdoor units reaches the preset value, comparing the average exhaust temperature of each outdoor unit with the average exhaust temperature of the multiple outdoor units to obtain a comparing result;
    controlling an electronic expansion valve of each outdoor unit to operate according to the comparing result to enable the average exhaust temperature of each outdoor unit to approximate to the average exhaust temperature of the multiple outdoor units.

2. The method for controlling a multi-split air conditioner according to claim 1, further comprising: when the difference between the average exhaust temperature of each outdoor unit and the average exhaust temperature of the multiple outdoor units reaches the preset value, performing a second determination as to whether a degree of superheat of a path in which the electronic expansion valve of each outdoor unit is located is greater than a first preset value, so as to compare the average exhaust temperature of each outdoor unit with the average exhaust temperature of the multiple outdoor units when the degree of superheat of the path in which the electronic expansion valve of each outdoor unit is located is greater than the first preset value.

3. The method for controlling a multi-split air conditioner according to claim 2, wherein controlling the electronic expansion valve to operate according to the result of comparing the average exhaust temperature of each outdoor unit with the average exhaust temperature of the multiple outdoor units, comprises:
    performing a third determination as to whether the average exhaust temperature of each outdoor unit is greater than the average exhaust temperature of the multiple outdoor units;
    if the result of the third determination is "yes", increasing a degree of opening of the corresponding electronic expansion valve; and
    if the result of the third determination is "no", reducing the degree of opening of the corresponding electronic expansion valve.

4. The method for controlling a multi-split air conditioner according to claim 3, wherein after performing the second determination as to whether the degree of superheat of the path in which the electronic expansion valve of each outdoor unit is located is greater than the first preset value, the method further comprises:
    when the degree of superheat of the path in which the electronic expansion valve of each outdoor unit is located is less than or equal to the first preset value, determining whether the degree of superheat of the path in which the electronic expansion valve is located is less than a second preset value;
    when the degree of superheat of the path in which the electronic expansion valve is located is less than the second preset value, maintaining a current degree of opening of the electronic expansion valve unchanged.

5. The method for controlling a multi-split air conditioner according to claim 3, wherein when the result of the third determination is "yes", increasing the degree of opening of the corresponding electronic expansion valve comprises:
    when the result of the third determination is "yes", determining whether the degree of opening of the electronic expansion valve of the outdoor unit is less than a maximum degree of opening;
    when the degree of opening of the electronic expansion valve of the outdoor unit is less than the maximum degree of opening, controlling the degree of opening of the electronic expansion valve to increase from a current degree of opening.

6. The method for controlling a multi-split air conditioner according to claim 3, wherein when the result of the third determination is "no", reducing the degree of opening of the corresponding electronic expansion valve comprises:
    when the result of the third determination is "no", determining whether the degree of opening of the electronic expansion valve of the outdoor unit is less than a minimum degree of opening;
    when the degree of opening of the electronic expansion valve of the outdoor unit is greater than the minimum degree of opening, controlling the degree of opening of the electronic expansion valve to reduce from a current degree of opening.

7. The method for controlling a multi-split air conditioner according to claim 1, wherein the multi-split air conditioner comprises two outdoor units; controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:
    determining whether the degree of opening of the electronic expansion valve of the outdoor unit with a higher average exhaust temperature in the two outdoor units is greater than a maximum degree of opening;
    when the degree of opening of the electronic expansion valve is less than the maximum degree of opening, controlling the degree of opening of the electronic expansion valve to increase from a current degree of opening.

8. The method for controlling a multi-split air conditioner according to claim 1, wherein the multi-split air conditioner comprises two outdoor units; controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:
  determining whether the degree of opening of the electronic expansion valve of the outdoor unit with a lower average exhaust temperature in the two outdoor units is greater than a minimum degree of opening;
  when the degree of opening of the electronic expansion valve is greater than the minimum degree of opening, controlling the degree of opening of the electronic expansion valve to reduce from a current degree of opening.

9. The method for controlling a multi-split air conditioner according to claim 1, wherein controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:
  determining whether the degree of opening of the electronic expansion valve of the outdoor unit whose average exhaust temperature is higher than the average exhaust temperature of the multiple outdoor units is greater than a maximum degree of opening;
  when the degree of opening of the electronic expansion valve is less than the maximum degree of opening, controlling the degree of opening of the electronic expansion valve to increase from a current degree of opening.

10. The method for controlling a multi-split air conditioner according to claim 1, wherein controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:
  determining whether the degree of opening of the electronic expansion valve of the outdoor unit whose average exhaust temperature is lower than the average exhaust temperature of the multiple outdoor units is greater than a minimum degree of opening;
  when the degree of opening of the electronic expansion valve is greater than the minimum degree of opening, controlling the degree of opening of the electronic expansion valve to reduce from a current degree of opening.

11. The method for controlling a multi-split air conditioner according to claim 1, wherein detecting whether the degree of superheat of each outdoor unit meets the target value comprises:
  obtaining an exhaust temperature of each outdoor unit;
  obtaining a lowest exhaust temperature in the exhaust temperatures of all the outdoor units by comparing the exhaust temperatures obtained;
  detecting whether the degree of superheat of the outdoor unit corresponding to the lowest exhaust temperature meets the target value.

12. The method for controlling a multi-split air conditioner according to claim 1, wherein determining whether the difference between the average exhaust temperature of each outdoor unit and the average exhaust temperature of a multiple outdoor units reaches the preset value comprises:
  obtaining the average exhaust temperature of each outdoor unit and the average exhaust temperature of the multiple outdoor units;
  obtaining an absolute value of the difference between the average exhaust temperature of each outdoor unit and the average exhaust temperature of the multiple outdoor units according to the average exhaust temperature of each outdoor unit and the average exhaust temperature of the multiple outdoor units;
  determining whether the absolute value reaches the preset value.

13. The method for controlling a multi-split air conditioner according to claim 1, further comprising:
  obtaining an exhaust temperature of the compressor of each outdoor unit;
  determining whether the exhaust temperature of the compressor of each outdoor unit is within a preset range;
  when the exhaust temperature of the compressor of the outdoor unit exceeds the preset range, releasing a fault signal.

14. A multi-split air conditioner system, wherein the multi-split air conditioner system comprises multiple outdoor units, each outdoor unit comprises at least one compressor; each outdoor unit further comprises a reversing valve, an outdoor heat exchanger, a gas-liquid separator, an electronic expansion valve, a high-pressure globe valve and a low-pressure globe valve connected on an outdoor unit pipeline; the multi-split air conditioner system further comprises a memory, a processor, and a program for controlling the multi-split air conditioner stored on the memory and capable of running on the processor; when executed by the processor, the program for controlling the multi-split air conditioner implements steps of the method for controlling the multi-split air conditioner comprising:
  detecting whether a degree of superheat of each outdoor unit meets a target value;
  when the degree of superheat of each outdoor unit meets the target value, determining whether a difference between an average exhaust temperature of each outdoor unit and an average exhaust temperature of the multiple outdoor units reaches a preset value;
  when the difference between the average exhaust temperature of each outdoor unit and the average exhaust temperature of the multiple outdoor units reaches the preset value, comparing the average exhaust temperature of each outdoor unit with the average exhaust temperature of the multiple outdoor units to obtain a comparing result;
  controlling the electronic expansion valve of each outdoor unit to operate according to the comparing result to enable the average exhaust temperature of each outdoor unit to approximate to the average exhaust temperature of the multiple outdoor units.

15. A non-transitory computer readable storage medium, configured to store a program for controlling a multi-split air conditioner that, when executed by a processor, implement the method for controlling the multi-split air conditioner, comprising:

detecting whether a degree of superheat of each outdoor unit meets a target value;

when the degree of superheat of each outdoor unit meets the target value, determining whether a difference between an average exhaust temperature of each outdoor unit and an average exhaust temperature of the multiple outdoor units reaches a preset value;

when the difference between the average exhaust temperature of each outdoor unit and the average exhaust temperature of the multiple outdoor units reaches the preset value, comparing the average exhaust temperature of each outdoor unit with the average exhaust temperature of the multiple outdoor units to obtain a comparing result;

controlling an electronic expansion valve of each outdoor unit to operate according to the comparing result to enable the average exhaust temperature of each outdoor unit to approximate to the average exhaust temperature of the multiple outdoor units.

16. The computer readable storage medium for controlling a multi-split air conditioner according to claim 15, further comprising: when the difference between the average exhaust temperature of each outdoor unit and the average exhaust temperature of the multiple outdoor units reaches the preset value, performing a second determination as to whether a degree of superheat of a path in which the electronic expansion valve of each outdoor unit is located is greater than a first preset value, so as to compare the average exhaust temperature of each outdoor unit with the average exhaust temperature of the multiple outdoor units when the degree of superheat of the path in which the electronic expansion valve of each outdoor unit is located is greater than the first preset value.

17. The computer readable storage medium for controlling a multi-split air conditioner according to claim 16, wherein controlling the electronic expansion valve to operate according to the result of comparing the average exhaust temperature of each outdoor unit with the average exhaust temperature of the multiple outdoor units, comprises:

performing a third determination as to whether the average exhaust temperature of each outdoor unit is greater than the average exhaust temperature of the multiple outdoor units;

if the result of the third determination is "yes", increasing a degree of opening of the corresponding electronic expansion valve; and if the result of the third determination is "no", reducing the degree of opening of the corresponding electronic expansion valve.

18. The computer readable storage medium for controlling a multi-split air conditioner according to claim 15, wherein the multi-split air conditioner comprises two outdoor units; controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:

determining whether the degree of opening of the electronic expansion valve of the outdoor unit with a higher average exhaust temperature in the two outdoor units is greater than a maximum degree of opening;

when the degree of opening of the electronic expansion valve is less than the maximum degree of opening, controlling the degree of opening of the electronic expansion valve to increase from a current degree of opening.

19. The computer readable storage medium for controlling a multi-split air conditioner according to claim 15, wherein the multi-split air conditioner comprises two outdoor units; controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:

determining whether the degree of opening of the electronic expansion valve of the outdoor unit with a lower average exhaust temperature in the two outdoor units is greater than a minimum degree of opening;

when the degree of opening of the electronic expansion valve is greater than the minimum degree of opening, controlling the degree of opening of the electronic expansion valve to reduce from a current degree of opening.

20. The computer readable storage medium for controlling a multi-split air conditioner according to claim 15, wherein controlling the electronic expansion valve to operate according to the result of comparing the average exhaust temperature of each outdoor unit with the average exhaust temperature of the multiple outdoor units, to enable the average exhaust temperature of each outdoor unit to approximate to the average exhaust temperature of the multiple outdoor units, comprises:

determining whether the degree of opening of the electronic expansion valve of the outdoor unit whose average exhaust temperature is higher than the average exhaust temperature of the multiple outdoor units is greater than a maximum degree of opening;

when the degree of opening of the electronic expansion valve is less than the maximum degree of opening, controlling the degree of opening of the electronic expansion valve to increase from a current degree of opening.

\* \* \* \* \*